(12) United States Patent
Zeng et al.

(10) Patent No.: US 12,505,212 B2
(45) Date of Patent: Dec. 23, 2025

(54) AUTOMATED CODE SIGNATURE GENERATION FOR WINDOWS .NET BINARIES

(71) Applicant: Palo Alto Networks, Inc., Santa Clara, CA (US)

(72) Inventors: Dongrui Zeng, Sunnyvale, CA (US); Yang Ji, San Jose, CA (US); Wenjun Hu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 135 days.

(21) Appl. No.: 18/497,689

(22) Filed: Oct. 30, 2023

(65) Prior Publication Data

US 2025/0139244 A1    May 1, 2025

(51) Int. Cl.
*G06F 21/56*    (2013.01)
(52) U.S. Cl.
CPC .......... *G06F 21/564* (2013.01); *G06F 21/565* (2013.01); *G06F 2221/033* (2013.01)

(58) Field of Classification Search
CPC .................. G06F 21/56; G06F 21/651; G06F 21/562–565; G06F 21/566; G06F 2221/033
See application file for complete search history.

(56) References Cited

U.S. PATENT DOCUMENTS

| | | |
|---|---|---|
| 2018/0191754 A1 | 7/2018 | Higbee |
| 2021/0117544 A1 | 4/2021 | Kurtz |
| 2023/0195896 A1 | 6/2023 | Samuel |
| 2023/0306114 A1 | 9/2023 | Yang |

FOREIGN PATENT DOCUMENTS

EP        2560120 B1  * 10/2019  ........... G06F 16/338

* cited by examiner

*Primary Examiner* — Kevin Bechtel
(74) *Attorney, Agent, or Firm* — Van Pelt, Yi & James LLP

(57) ABSTRACT

Various embodiments provide a system, method, and device for generating a signature for Windows .NET binaries. The method incudes (i) generate a file signature based on code using a hashing technique, and (ii) classify a sample using the file signature based on the code.

23 Claims, 22 Drawing Sheets

| | | | |
|---|---|---|---|
| 20E8 | 02 | ldarg.0 | |
| 20E9 | 7b 07 00 00 04 | ldfld | token(0x04000007) |
| 20EE | 2d 4a | brtrue.s | 8506 |
| 20F0 | 02 | ldarg.0 | |
| 20F1 | 28 02 00 00 06 | call | token(0x06000002) |
| 20F6 | 2d 18 | brtrue.s | 8464 |
| 20F8 | 02 | ldarg.0 | |
| 20F9 | 28 04 00 00 06 | call | token(0x06000004) |
| 20FE | 2d 10 | brtrue.s | 8464 |
| 2100 | 02 | ldarg.0 | |
| 2101 | 28 06 00 00 06 | call | token(0x06000006) |
| 2106 | 2d 08 | brtrue.s | 8464 |
| 2108 | 02 | ldarg.0 | |
| 2109 | 28 0a 00 00 06 | call | token(0x0600000A) |
| 210E | 2c 2a | brfalse.s | 8506 |
| 2110 | 02 | ldarg.0 | |
| 2111 | 02 | ldarg.0 | |
| 2112 | 28 02 00 00 06 | call | token(0x06000002) |
| 2117 | 02 | ldarg.0 | |
| 2118 | 28 04 00 00 06 | call | token(0x06000004) |
| 211D | 02 | ldarg.0 | |
| 211E | 28 0a 00 00 06 | call | token(0x0600000A) |
| 2123 | 02 | ldarg.0 | |
| 2124 | 28 06 00 00 06 | call | token(0x06000006) |
| 2129 | 14 | ldnull | |
| 212A | 16 | ldc.i4.0 | |
| 212B | 73 19 00 00 0a | newobj | token(0x0A000019) |
| 2130 | 28 1a 00 00 0a | call | token(0x0A00001A) |
| 2135 | 7d 07 00 00 04 | stfld | token(0x04000007) |
| 213A | 02 | ldarg.0 | |
| 213B | 7b 07 00 00 04 | ldfld | token(0x04000007) |
| 2140 | 25 | dup | |
| 2141 | 2d 07 | brtrue.s | 8522 |
| 2143 | 26 | pop | |
| 2144 | 14 | ldnull | |
| 2145 | 28 01 00 00 2b | call | token(0x2B000001) |
| 214A | 2a | ret | |

| | | | |
|---|---|---|---|
| 2158 | 14 | ldnull | |
| 2159 | 0a | stloc.0 | |
| 215A | 02 | ldarg.0 | |
| 215B | 28 08 00 00 06 | call | token(0x06000008) |
| 2160 | 2d 10 | brtrue.s | 8562 |
| 2162 | 02 | ldarg.0 | |
| 2163 | 28 0c 00 00 06 | call | token(0x0600000C) |
| 2168 | 0b | stloc.1 | |
| 2169 | 12 01 | ldloca.s | local(0x0001) |
| 216B | 28 1c 00 00 0a | call | token(0x0A00001C) |
| 2170 | 2c 27 | brfalse.s | 8601 |
| 2172 | 03 | ldarg.1 | |
| 2173 | 6f 1d 00 00 0a | callvirt | token(0x0A00001D) |
| 2178 | 0a | stloc.0 | |
| 2179 | 06 | ldloc.0 | |
| 217A | 02 | ldarg.0 | |
| 217B | 28 08 00 00 06 | call | token(0x06000008) |
| 2180 | 6f 1e 00 00 0a | callvirt | token(0x0A00001E) |
| 2185 | 06 | ldloc.0 | |
| 2186 | 02 | ldarg.0 | |
| 2187 | 28 0c 00 00 06 | call | token(0x0600000C) |
| 218C | 0b | stloc.1 | |
| 218D | 12 01 | ldloca.s | local(0x0001) |
| 218F | 28 1f 00 00 0a | call | token(0x0A00001F) |
| 2194 | 6f 20 00 00 0a | callvirt | token(0x0A000020) |
| 2199 | 06 | ldloc.0 | |
| 219A | 2a | ret | |

| | | | |
|---|---|---|---|
| 8968 | 02 | ldarg.0 | |
| 8969 | 73 46 00 00 0a | newobj | token(0x0A000046) |
| 896E | 0a | stloc.0 | |
| 896F | 73 14 00 00 06 | newobj | token(0x06000014) |
| 8974 | 0b | stloc.1 | |
| 8975 | 1b | ldc.i4.5 | |
| 8976 | 8d cf 00 00 01 | newarr | token(0x010000CF) |
| 897B | 0c | stloc.2 | |
| 897C | 16 | ldc.i4.0 | |
| 897D | 0d | stloc.3 | |
| 897E | 2b 0e | br.s | 35214 |
| 8980 | 09 | ldloc.3 | |
| 8981 | 06 | ldloc.0 | |
| 8982 | 08 | ldloc.2 | |
| 8983 | 09 | ldloc.3 | |
| 8984 | 1b | ldc.i4.5 | |
| 8985 | 09 | ldloc.3 | |
| 8986 | 59 | sub | |
| 8987 | 6f 47 00 00 0a | callvirt | token(0x0A000047) |
| 898C | 58 | add | |
| 898D | 0d | stloc.3 | |
| 898E | 09 | ldloc.3 | |
| 898F | 1b | ldc.i4.5 | |
| 8990 | 32 ee | blt.s | 35200 |
| 8992 | 07 | ldloc.1 | |
| 8993 | 08 | ldloc.2 | |
| 8994 | 6f 1a 00 00 06 | callvirt | token(0x0600001A) |
| 8999 | 16 | ldc.i4.0 | |
| 899A | 0d | stloc.3 | |
| 899B | 2b 0e | br.s | 35243 |
| 899D | 09 | ldloc.3 | |
| 899E | 06 | ldloc.0 | |
| 899F | 08 | ldloc.2 | |
| 89A0 | 09 | ldloc.3 | |
| 89A1 | 1a | ldc.i4.4 | |
| 89A2 | 09 | ldloc.3 | |
| 89A3 | 59 | sub | |
| 89A4 | 6f 47 00 00 0a | callvirt | token(0x0A000047) |
| 89A9 | 58 | add | |
| 89AA | 0d | stloc.3 | |
| 89AB | 09 | ldloc.3 | |
| 89AC | 1a | ldc.i4.4 | |
| 89AD | 32 ee | blt.s | 35229 |
| 89AF | 7e 48 00 00 0a | ldsfld | token(0x0A000048) |
| 89B4 | 2d 08 | brtrue.s | 35262 |
| 89B6 | 08 | ldloc.2 | |

| | | | |
|---|---|---|---|
| 89B7 | 16 | ldc.i4.0 | |
| 89B8 | 1a | ldc.i4.4 | |
| 89B9 | 28 49 00 00 0a | call | token(0x0A000049) |
| 89BE | 08 | ldloc.2 | |
| 89BF | 16 | ldc.i4.0 | |
| 89C0 | 28 4a 00 00 0a | call | token(0x0A00004A) |
| 89C5 | 13 04 | stloc.s | local(0x0004) |
| 89C7 | 11 04 | ldloc.s | local(0x0004) |
| 89C9 | 8d cf 00 00 01 | newarr | token(0x010000CF) |
| 89CE | 25 | dup | |
| 89CF | 17 | ldc.i4.1 | |
| 89D0 | 73 4b 00 00 0a | newobj | token(0x0A00004B) |
| 89D5 | 13 05 | stloc.s | local(0x0005) |
| 89D7 | 06 | ldloc.0 | |
| 89D8 | 6f 4c 00 00 0a | callvirt | token(0x0A00004C) |
| 89DD | 1b | ldc.i4.5 | |
| 89DE | 6a | conv.i8 | |
| 89DF | 59 | sub | |
| 89E0 | 1a | ldc.i4.4 | |
| 89E1 | 6a | conv.i8 | |
| 89E2 | 59 | sub | |
| 89E3 | 13 06 | stloc.s | local(0x0006) |
| 89E5 | 07 | ldloc.1 | |
| 89E6 | 06 | ldloc.0 | |
| 89E7 | 11 05 | ldloc.s | local(0x0005) |
| 89E9 | 11 06 | ldloc.s | local(0x0006) |
| 89EB | 11 04 | ldloc.s | local(0x0004) |
| 89ED | 6a | conv.i8 | |
| 89EE | 6f 19 00 00 06 | callvirt | token(0x06000019) |
| 89F3 | 2a | ret | |

AUTOMATED CODE SIGNATURE GENERATION FOR WINDOWS .NET BINARIES

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

FIG. 3A is an illustration of code for a method comprised in an example of a benign .NET file.

FIG. 3B is an illustration of a wildcarded method based on the method code for the method comprised in an example of a benign .NET file.

FIG. 3C is an illustration of code for a method comprised in an example of a benign .NET file.

FIG. 3D is an illustration of a wildcarded method based on the method code for the method comprised in an example of a benign .NET file.

FIG. 4A is an illustration of code for a method comprised in an example of a malicious .NET file.

FIG. 4B is an illustration of a wildcarded method based on the method code for the method comprised in an example of a malicious .NET file.

FIG. 4C is an illustration of code for a method comprised in an example of a malicious .NET file.

FIG. 4D is an illustration of a wildcarded method based on the method code for the method comprised in an example of a malicious .NET file.

DETAILED DESCRIPTION

Figure 1:
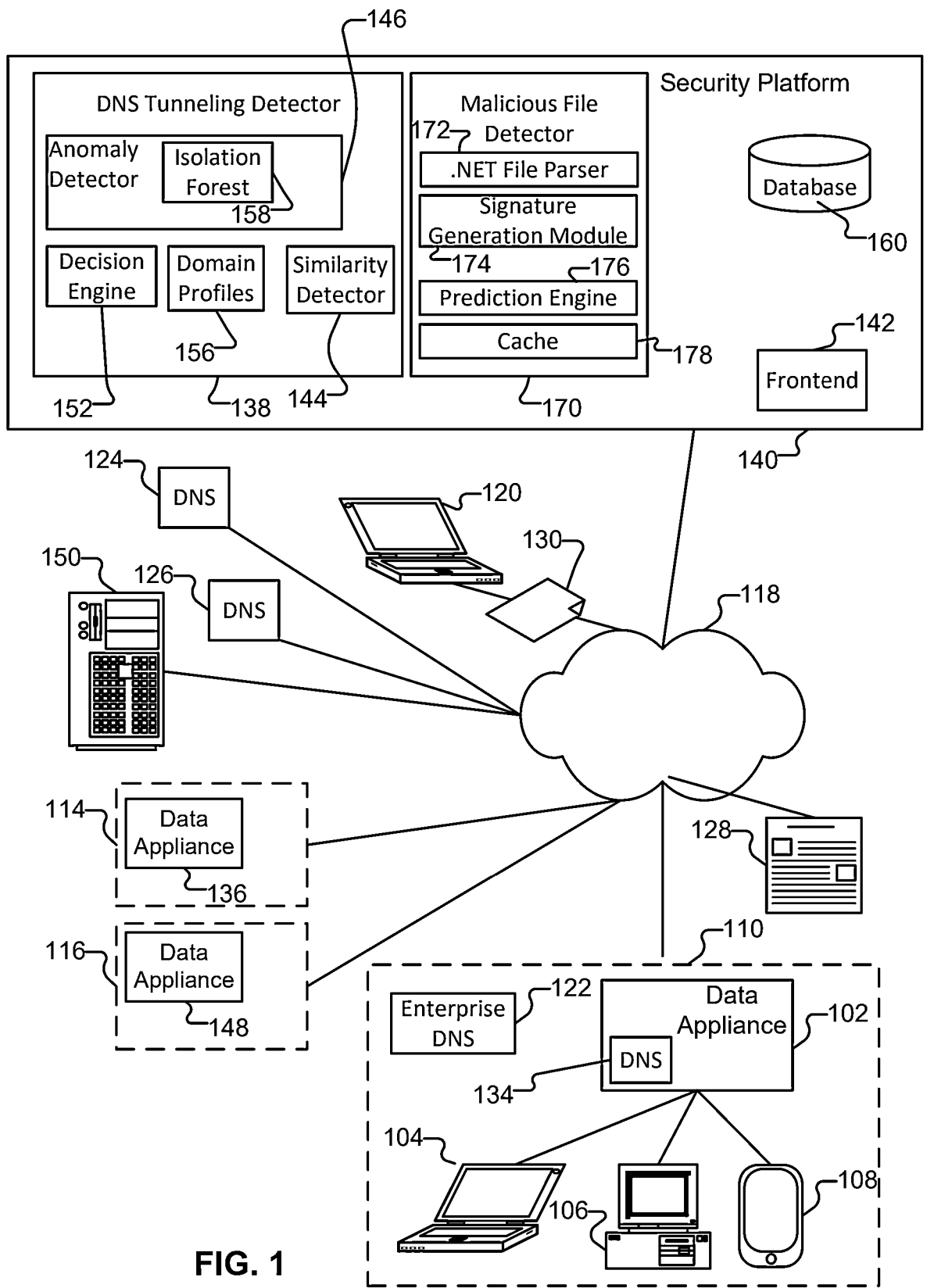
FIG. 1 is a block diagram of an environment in which a malicious file is detected or suspected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a security entity is a network node (e.g., a device) that enforces one or more security policies with respect to information such as network traffic, files, etc. As an example, a security entity may be a firewall. As another example, a security entity may be implemented as a router, a switch, a DNS resolver, a computer, a tablet, a laptop, a smartphone, etc. Various other devices may be implemented as a security entity. As another example, a security may be implemented as an application running on a device, such as an anti-malware application.

As used herein, malware refers to an application that engages in behaviors, whether clandestinely or not (and whether illegal or not), of which a user does not approve/would not approve if fully informed. Examples of malware include trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

Binaries produced by the .NET framework have rich information for malware learning and detection. For example, the imported DLLs, functions and the TypeRef table in a .NET binary can be hashed and used as a file signature, which is referred to as TypeRefHash or TRH. However, TRH relies on the DLL symbols and function names, which can be easily obfuscated to escape from detection. In contrast, obfuscating the code of a .NET binary, written in Microsoft Intermediate Language (MSIL), is less common and more difficult. Additionally, because code is the direct representation of an executable's functionality, malware detection relying on the code is generally more accurate. Various embodiments thus automatically transform the code of each method in a .NET binary into a hash, based on which a file signature is computed (also referred to herein as the DNCodeHash). The file signature can be used for malware detection with low false positive rate and for code similarity-based malware clustering.

According to various embodiments, the system (i) parses a .NET binary and identifies methods (e.g., functions invoked by the code for the file), (ii) transforms each method's MSIL code into a uniformed format and hashing the uniformed format (e.g., to obtain a function hash or intermediate signature), and (iii) synthesizes a set of function hashes (e.g., all function hashes for the file) into a single file signature (e.g., DNCodeHash). The DNCodeHash can be used for malware learning, detection, and clustering. Moreover, the function hashes can also be used as indicators of compromise in a more fine-grained malware detection. Parsing can rely on various open-source tools. The .NET binaries generally conform to a well-defined format and MSIL, and the system disassembles the .NET binaries, and parses the format and code. Various parsing techniques may be implemented. For example, the system may use a predefined library, such as python libraries: dnfile and dncil. During the MSIL code transformation, for each MSIL instruction in a method, the system wildcards its operands. As a result, each method becomes independent of the concrete data. In this way, the wildcarded representation provides a signature of the method. In application, each wildcarded method representation is hashed (e.g., to obtain the intermediate signature or function hash) for efficient storage and comparison. Then, all hashes are sorted, concatenated, and hashed again into a synthesized hash, which is the DNCodeHash. The DNCodeHash can be used similarly to TypeRefHash, as an indicator of compromise (IOC).

According to various embodiments, the wildcarded representation for .NET methods achieves high accuracy in abstracting function code patterns, which can be used as a function-level code signature. Further, the file signature (e.g., the DNCodeHash) has high accuracy in abstracting the overall code patterns, which can be used as an IOC for malware detection. Signature generated from a single sample could cover a large amount of new samples in the same family. When used as IOC, experimental data shows that DNCodeHash can reduce 34.3% false positives and 16.1% false negatives. 3. The DNCodeHash is effective in code similarity-based clustering. It can improve ground truth verdicts and malware family as well as help increase the efficiency of analyzing false positives and false negatives. The clustering of files based on the DNCodeHash can be used to discover new malware families. In addition to the foregoing, the DNCodeHash signature generation is fully automated and efficient. For example, the system according to various embodiments can determine the file signature (e.g., the DNCodeHash) within 0.518 seconds for one .NET binary.

Various embodiments provide a system, method, and device for generating a signature for Windows .NET binaries. The method incudes (i) generating a file signature based on code using a hashing technique, and (ii) classifying a sample using the file signature based on the code.

FIG. 1 is a block diagram of an environment in which a malicious file is detected or suspected according to various embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, .NET files, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security platform 140. Security platform 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of files to indications of whether the file is malicious or benign), providing a likelihood that an input string or file (e.g., a .NET file) is malicious or benign, providing/updating a whitelist of input strings or files deemed to be benign, providing/updating input strings or files deemed to be malicious, identifying malicious domains, detecting malicious input strings, detecting malicious files, predicting whether an input string or file (e.g., a .NET file) is malicious, and providing an indication that an input string or file is malicious (or benign). In various embodiments, results of analysis (and additional information pertaining to applications, domains, etc.) are stored in database 160. In various embodiments, security platform 140 comprises one or more dedicated commercially available hardware servers (e.g., having multi-core processor(s), 32 G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

In some embodiments, system 100 (e.g., malicious file detector 170, security platform 140, etc.) is configured detect exploits (e.g., malicious .NET files), such as based on generating file signatures and querying an index of signatures for known files (e.g., files that have been previously classified), or to assign the file to another system or service (e.g., a machine learning model, or a human operator) tasked with analyzing and classifying the file. The system 100 determines a set of functions in the file, and generates a file signature based at least in part on the set of functions in the file, such as based on intermediate signatures respectively computed for the various functions in the set of functions.

According to various embodiments, security platform 140 comprises DNS tunneling detector 138 and/or malicious file detector 170. Malicious file detector 170 is used in connection with determining whether a .NET file is malicious. In response to receiving a sample (e.g., a .NET file), malicious file detector 170 analyzes the .NET file, and determines whether the sample is malicious. For example, malicious file detector 170 determines the file signature and queries an index/database of signatures for known files (e.g., previously analyzed and classified files), such as a whitelist or a blacklist of files. In some embodiments, malicious file detector 170 receives a .NET file, performs a function extraction, determines intermediate signatures for the extracted functions, determines a files signature based on the intermediate signatures, and determines (e.g., predicts) whether the .NET file is malicious based at least in part on the querying the index for known files (e.g., a mapping of signatures for the known files to an indication of whether the corresponding file is malicious).

In some embodiments, malicious file detector 170 comprises one or more of .NET file parser 172, signature generation module 174, prediction engine 176, and/or cache 178.

.NET file parser 172 is used in connection with obtaining information pertaining to the sample such as a .NET file. In some embodiments, .NET file parser 172 disassembles the file to obtain the MSIL and to identify the various functions invoked by the file.

Signature generation module 174 generates the file signature for the file. In some embodiments, signature generation module 174 generates the file signature based at least in part on a set of identified functions invoked by the file. For example, signature generation module 174 determines (i) function code for the identified functions, (ii) function wildcards (e.g., wildcarded methods) based on the function code, (iii) function hashes/intermediate signatures for the function wildcard, and (iv) a file signature based on the function hashes/intermediate signatures.

In some embodiments, prediction engine 176 determines whether the .NET is malicious (e.g., provides a prediction/likelihood of whether the file is malicious) based at least in part on one or more of (i) a mapping of NET files to indications of whether the corresponding .NET files are malicious, (ii) a mapping of an identifier for a .NET file (e.g., a hash or other signature associated with the .NET file) to indications of whether the corresponding .NET files are malicious, and/or (iii) a classifier (e.g., a model trained using a machine learning process).

According to various embodiments, in response to prediction engine 176 determining that the received .NET file is malicious, the system sends to a security entity an indication that the .NET file is malicious. For example, malicious file detector 170 may send to a security entity (e.g., a firewall) or network node (e.g., a client) an indication that the .NET file is malicious. The indication that the .NET file is malicious may correspond to an update to a blacklist of NET files (e.g., corresponding to malicious .NET files) such as in the case that the received .NET file is deemed to be malicious, or an update to a whitelist of .NET files (e.g., corresponding to non-malicious .NET files) such as in the case that the received .NET file is deemed to be benign. In some embodiments, malicious file detector 170 sends a hash or signature corresponding to the .NET file in connection with the indication that the .NET file is malicious or benign. The security entity or endpoint may compute a hash or signature for a .NET file and perform a lookup against a mapping of hashes/signatures to indications of whether .NET files are malicious/benign (e.g., query a whitelist and/or a blacklist). In some embodiments, the hash or signature uniquely identifies the .NET file.

In response to receiving a .NET file to be analyzed, malicious file detector 170 can determine whether the .NET file corresponds to a previously analyzed .NET file (e.g., whether the .NET file matches a .NET file associated with historical information for which a maliciousness determination has been previously computed). As an example, malicious file detector 170 determines whether an identifier or representative information corresponding to the .NET file is comprised in the historical information (e.g., a blacklist, a whitelist, etc.). In some embodiments, representative information corresponding to the .NET file is a hash or signature of the .NET file. In some embodiments, malicious file detector 170 (e.g., prediction engine 176) determines whether information pertaining to a particular .NET file is comprised in a dataset of historical .NET files and/or historical information associated with the historical dataset indicating whether a particular .NET file is malicious (e.g., a third-party service such as VirusTotal™). In response to determining that information pertaining to a particular .NET file is not comprised in, or available in, the dataset of historical .NET files and/or historical information, malicious file detector 170 may deem that the .NET file has not yet been analyzed and malicious file detector 170 can invoke an analysis of the .NET file in connection with determining (e.g., predicting) whether the .NET file is malicious (e.g., malicious file detector 170 can query a classifier based on the .NET file in connection with determining whether the .NET file is malicious). An example of the historical information associated with the historical files indicating whether a particular .NET file is malicious corresponds to a VirusTotal® (VT) score. In the case of a VT score greater than 0 for a particular .NET file, the particular .NET file is deemed malicious by the third-party service. In some embodiments, the historical information associated with the historical NET files indicating whether a particular .NET file is malicious corresponds to a social score such as a community-based score or rating (e.g., a reputation score) indicating that a .NET file is malicious or likely to be malicious. The historical information (e.g., from a third-party service, a community-based score, etc.) indicates whether other vendors or cyber security organizations deem the particular .NET file to be malicious.

In some embodiments, malicious file detector 170 (e.g., prediction engine 176) determines that a received file is newly analyzed (e.g., that the .NET file is not within the historical information/dataset, is not on a whitelist or blacklist, etc.). Malicious file detector 170 (e.g., .NET file parser 172) may detect that a .NET file is newly analyzed in response to security platform 140 receiving the .NET file from a security entity (e.g., a firewall) or endpoint within a network. For example, malicious file detector 170 determines whether a .NET file is newly analyzed contemporaneous with the .NET file being received by the security platform 140 or malicious file detector 170. As another example, malicious file detector 170 (e.g., prediction engine 176) determines that a .NET file is newly analyzed according to a predefined schedule (e.g., daily, weekly, monthly, etc.), such as in connection with a batch process. In response to determining that a .NET file that is received that has not yet been analyzed with respect to whether such NET file is malicious (e.g., the system does not comprise historical information with respect to such .NET file), malicious file detector 170 determines whether to use another service to analyze the .NET file such as a machine learning model (e.g., to query a classifier to analyze the .NET file or one or more feature vectors associated with the .NET file, etc.) or a human operator.

Cache 178 stores information pertaining to a .NET file. In some embodiments, cache 178 stores mappings of indications of whether a .NET file is malicious (or likely malicious) to particular .NET files, or mappings of indications of whether a .NET file is malicious (or likely malicious) to hashes or signatures corresponding to .NET files. Cache 178 may store additional information pertaining to a set of NET files such as attributes of the .NET file, hashes or signatures corresponding to the .NET file in the set of NET files, other unique identifiers corresponding to a .NET file in the set of .NET files, etc.

Returning to FIG. 1, suppose that a malicious individual (using client device 120) has created malware 130 (e.g., a malicious .NET file). The malicious individual hopes that a client device, such as client device 104, will execute a copy of malware or other exploit (e.g., malicious .NET file) 130, compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into data appliance 102 (as shown in FIG. 1) and can also operate as a standalone appliance in various embodiments. And, as with other components shown in FIG. 1, DNS module 134 can be provided by the same entity that provides data appliance 102 (or security platform 140), and can also be provided by a third party (e.g., one that is different from the provider of data appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138) whether the queried domain indicates a malicious DNS tunneling attempt and provide a result back to DNS module 134 (e.g., "malicious DNS tunneling" or "non-tunneling").

In various embodiments, when a client device (e.g., client device 104) attempts to open a .NET file that was received, such as via an attachment to an email, instant message, or otherwise exchanged via a network, or when a client device receives such a .NET file, DNS module 134 uses the .NET file (or a computed hash or signature, or other unique identifier, etc.) as a query to security platform 140. This query can be performed contemporaneously with receipt of the .NET file, or in response to a request from a user to scan the .NET file. As one example, data appliance 102 can send a query (e.g., in the JSON format) to a frontend 142 of security platform 140 via a REST API. Using processing described in more detail below, security platform 140 will determine (e.g., using a malicious file detector that may be similar to malicious file detector 170 such as by using a machine learning model to detect/predict whether the file is malicious) whether the queried file is a malicious file (or likely to be a malicious file) and provide a result back to data appliance 102 (e.g., "malicious file" or "benign file").

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), data appliance 102 provides the DNS queries to security platform 140 which performs both anomaly detection and similarity detection, respectively. In various embodiments, a domain (e.g., as provided in a query received by security platform 140) is classified as a malicious DNS tunneling root domain if either detector flags the domain.

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

In some embodiments, malicious file detector 170 provides to a security entity, such as data appliance 102, an indication whether a .NET file is malicious. For example, in response to determining that the .NET file is malicious, malicious file detector 170 sends an indication that the .NET file is malicious to data appliance 102, and the data appliance may in turn enforce one or more security policies based at least in part on the indication that the .NET file is malicious. The one or more security policies may include isolating/quarantining the .NET file, deleting the .NET file, ensuring that the .NET file is not executed or resolved, alerting or prompting the user of the maliciousness of the .NET file prior to the user opening/executing the .NET file, etc. As another example, in response to determining that the .NET file is malicious, malicious file detector 170 provides to the security entity an update of a mapping of NET files (or hashes, signatures, or other unique identifiers corresponding to .NET files) to indications of whether a corresponding .NET file is malicious, or an update to a blacklist for malicious .NET files (e.g., identifying malicious .NET files) or a whitelist for benign .NET files (e.g., identifying .NET files that are not deemed malicious).

Figure 2:
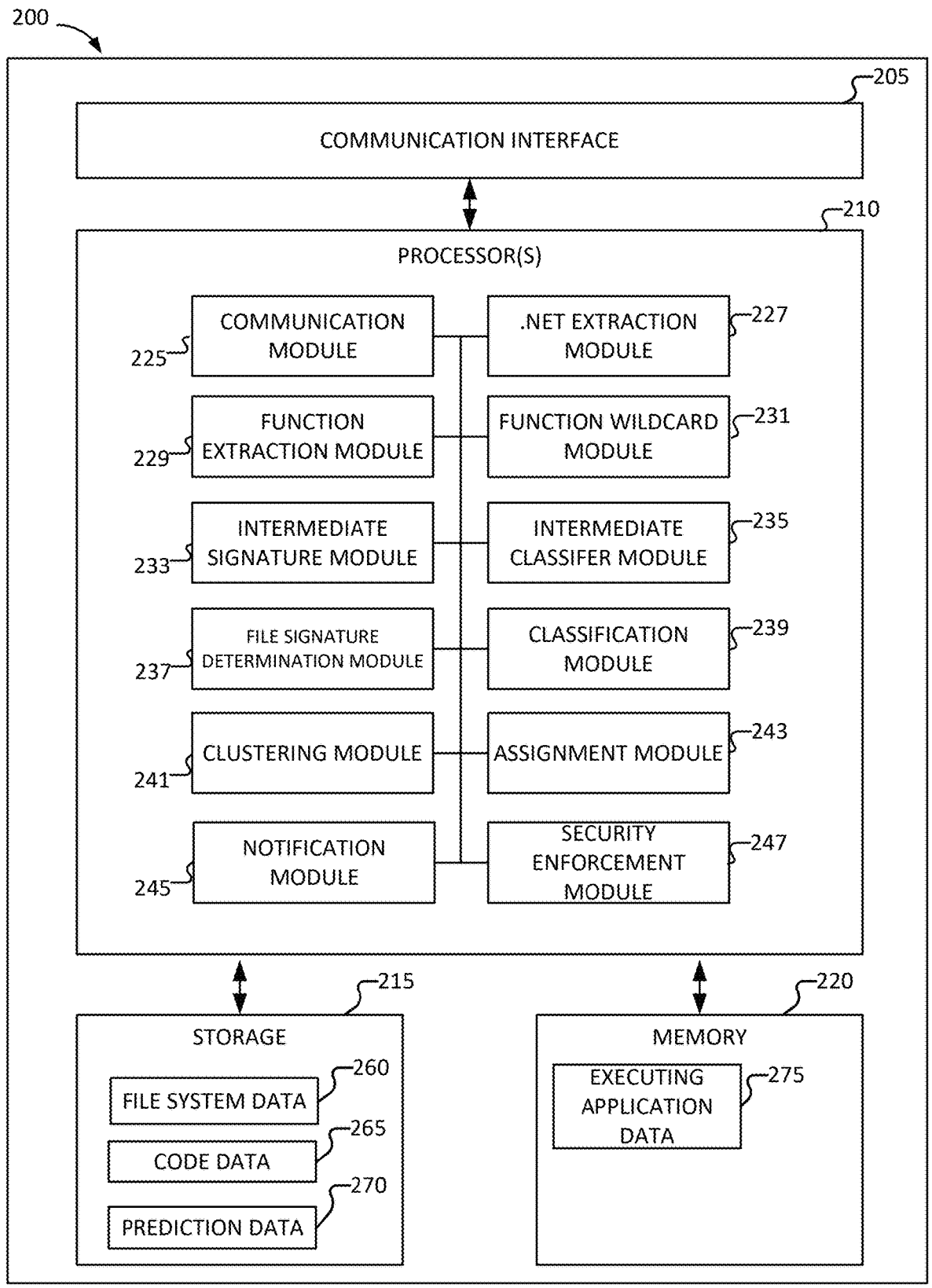
FIG. 2 is a block diagram of a system to detect a malicious file according to various embodiments.

FIG. 2 is a block diagram of a system to detect a malicious file according to various embodiments. According to various embodiments, system 200 is implemented in connection with system 100 of FIG. 1, such as for malicious file detector 170. In various embodiments, system 200 is implemented in connection with process 500 of FIG. 5, process 600 of FIG. 6, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and/or process 1600 of FIG. 16. System 200 may be implemented in one or more servers, a security entity such as a firewall, and/or an endpoint.

System 200 can be implemented by one or more devices such as servers. System 200 can be implemented at various locations on a network. In some embodiments, system 200 implements malicious file detector 170 of system 100 of FIG. 1. As an example, system 200 is deployed as a service, such as a web service (e.g., system 200 determines whether a .NET file is malicious, and provides such determinations as a service). The service may be provided by one or more servers (e.g., system 200 or the malicious file detector is deployed on a remote server that monitors or receives files (e.g., .NET files) that are transmitted within or into/out of a network such as via inputs to a web interface such as a login screen, an authentication interface, a query interface, etc., or attachments to emails, instant messages, etc., and determines whether a .NET file is malicious, and sends/pushes out notifications or updates pertaining to the .NET file such as an indication whether a. NET file is malicious). As another example, the malicious file detector is deployed on a firewall.

According to various embodiments, in response to receiving the .NET file to be analyzed to determine whether the .NET file is malicious, system 200 uses a classifier to determine whether the .NET file is malicious (or to determine a likelihood that the .NET file is malicious). For example, system 200 uses the classifier to provide a prediction of whether the .NET file is malicious. In some embodiments, system 200 determines a file signature for the .NET file and uses the classifier to analyze the file signature in connection with determining whether the .NET file is malicious. For example, system 200 uses the file signature to query an index (e.g., a mapping of signatures to indications that the corresponding files are malicious, benign, etc.) to determine whether the index stores a matching signature for a known sample (e.g., a previously analyzed/classified sample).

In the example shown, system 200 implements one or more modules in connection with classifying a file, such as predicting whether a .NET file (e.g., a newly received .NET file) is malicious, determining a likelihood that the .NET file is malicious, and/or providing a notice or indication of whether a .NET file is malicious or benign/non-malicious. System 200 comprises communication interface 205, one or more processors 210, storage 215, and/or memory 220. One or more processors 210 comprises one or more of communication module 225, .NET extraction module 227, function extraction module 229, function wildcard module 231, intermediate signature module 233, intermediate classifier module 235, file signature determination module, classification module 239, clustering module 241, assignment module 243, notification module 245, and security enforcement module 247.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface 205 provides to communication module 225 information received by system 200. Communication module 225 is configured to receive a .NET file(s) to be analyzed, such as from network endpoints or nodes such as security entities (e.g., firewalls), database systems, query systems, etc. Communication module 225 is configured to query third party service(s) for information pertaining to .NET files (e.g., services that expose information for .NET files such as third-party scores or assessments of maliciousness of NET files, a community-based score, assessment, or reputation pertaining to .NET files, a blacklist for .NET files, and/or a whitelist for .NET files, etc.). For example, system 200 uses communication module 225 to query the third-party service(s). Communication module 225 is configured to receive one or more settings or configurations from an administrator. Examples of the one or more settings or configurations include configurations of a process determining whether a .NET file is malicious, a format or process according to which a combined feature vector is to be determined, a set of feature vectors to be provided to a classifier for determining whether the .NET file is malicious, a definition of the hashing function to determine an intermediate signature, a definition of the hashing function to determine a file signature, a configuration pertaining to sample traffic (e.g., benign files or malicious files) to be used in connection with the generating of training the classifier, information pertaining to a whitelist of .NET files (e.g., .NET files that are not deemed suspicious and for which traffic or attachments are permitted), information pertaining to a blacklist of .NET files (e.g., .NET files that are deemed suspicious and for which traffic is to be quarantined, deleted, or otherwise to be restricted from being executed), etc.

In some embodiments, system 200 comprises .NET extraction module 227. System 200 uses .NET extraction module 227 in connection with determining whether to extract information pertaining to (e.g., from) a header or metadata for a .NET file, and with extracting information for a .NET file (e.g., for analysis of whether the .NET file is malicious). In some embodiments, .NET extraction module 227 receives .NET files to be analyzed such as .NET files that are included as attachments to emails, instant messages, or that otherwise are communicated across or into/out of a network. .NET extraction module disassembles the .NET file to obtain the MSIL code corresponding to the .NET file to be analyzed.

In some embodiments, system 200 comprises function extraction module 229. System 200 uses function extraction module 229 to identify the functions in the MSIL code obtained by .NET extraction module 227. In response to identifying the functions in the MSIL code, the system extracts corresponding function code (e.g., also referred to herein as method code).

In some embodiments, system 200 comprises function wildcard module 231. System 200 uses function wildcard module 231 to obtain a function wildcard for function code obtained by function extraction module 229. Function wildcard module 231 obtains the wildcard by transforming the function to a representation that is data independent. For example, function wildcard module 231 determines the operators and corresponding operands in a function, and replaces the operands with a predefined special character (e.g., ?). Function wildcard module 231 normalizes the function to disregard the operand information.

In some embodiments, system 200 iteratively obtains the function wildcard, obtains an intermediate signature for the function wildcard and queries an intermediate classifier to provide a quick classification of the file, such as based on a set of predefined YARA rules (e.g., a rule that indicates that the presence of a particular function in a file is indicative of the file being malicious). System 200 can iteratively process the set of function code extracted from the file until the earlier of (i) intermediate signatures have been generated for each function code, and (ii) system 200 (e.g., intermediate classifier module 235) determining that the file can be classified based on the presence of one or more particular functions (e.g., based on performing a check against a set of YARA rules).

In some embodiments, system 200 comprises intermediate signature module 233. System 200 uses intermediate signature module 233 to generate an intermediate signature with respect to a function. Intermediate signature module 233 computes the intermediate signature based on performing a hashing function with respect to the function wildcard. The intermediate signature may also be referred to as a function hash. Example of hashing algorithms that may be implemented in connection with determining a signature include MD5, SHA-1, SHA-2, SHA-256, NTLM, LANMAN, RIPEMD-160, etc. Various other predefined processes may be implemented to determine the intermediate signature.

In some embodiments, system 200 comprises intermediate classifier module 235. System 200 uses intermediate classifier module 235 to determine a classification for the file based at least in part on a subset of one or more intermediate signatures for a file. For example, the system determines whether the subset of intermediate signatures satisfies a YARA rule(s) that indicates a file is malicious if the file comprises one or more certain functions.

In some embodiments, system 200 comprises file signature determination module 237. System uses file signature determination module 237 to determine/generate a file signature for the file. File signature determination module 237 determines the file signature based at least in part on all the computed intermediate signatures. Alternatively, the file signature may be determined based at least in part on N intermediate signatures for functions of the file, where N is a positive integer less than the total number of functions associated with the file. In some embodiments, the file signature is performed based at least in part on performing a hashing function with respect to the intermediate signatures. Various hashing functions may be implemented. As an example, the hashing function is the SSDeep hashing function or the TLSH hashing function. In some embodiments, the hashing function used to compute the file signature is different from the hashing function used to compute the various intermediate signatures.

In some embodiments, file signature determination module 237 first sorts the intermediate signatures to be used to compute the file signatures, then concatenates the sorted intermediate signatures, and then computes a hash with respect to the concatenated sorted intermediate signatures. The intermediate signatures may be sorted based on value or alphabetically, etc.

In some embodiments, system 200 comprises classification module 239. System 200 uses classification module 239 to predict a classification for the file, such as predicting whether the file is malicious or benign/non-malicious. As an example, classification module 239 predicts the classification based at least in part on the file signature.

In response to determining the representative information or identifier(s) associated with the .NET file (e.g., the file signature), system 200 (e.g., classification module 239) may determine whether the .NET file corresponds to a previously analyzed .NET file (e.g., whether the .NET file matches a .NET file associated with historical information for which a maliciousness determination has been previously computed). As an example, classification module 239 queries a database or mapping of previously analyzed .NET files and/or historical information such as blacklists of NET files, and/or whitelists of NET files in connection with determining whether the .NET file was previously analyzed. In some embodiments, in response to determining that the .NET file does not correspond to a previously analyzed .NET file, classification module 239 uses a classifier (e.g., a model such as a model trained using a machine learning process) to determine (e.g., predict) whether the .NET file is malicious. Additionally, or alternatively, system 200 assigns the .NET file to another system, module, or service that is tasked with analyzing the unmatched .NET file to generate a classification and/or a corresponding YARA rule, if any. In some embodiments, in response to determining that the .NET file corresponds to a previously analyzed .NET file, classification module 239 obtains an indication of whether the corresponding previously analyzed .NET file is malicious. Classification module 239 can use the indication of whether the corresponding previously analyzed .NET file is malicious as an indication of whether the received .NET file is malicious.

In some embodiments, system 200 comprises clustering module 241. System 200 uses clustering module 241 to implement a clustering technique in connection with identifying new clusters of samples based on an extent to which file signatures are similar. For example, the system deems a set of samples to correspond to a particular cluster (e.g., a family of files, etc.) based on determination that a degree of similarity among any two samples exceeds a predefined similarity threshold (e.g., 95% similarity or other predefined percentage, etc.). As an example, the clustering technique includes clustering algorithms such as K-means++ and X-means to check for new clusters and notifying maintainers (e.g., subject matter experts, or another service for identifying emergent campaigns or tools) for manual investigation and labeling. Clustering module 241 may provide an indication of a new cluster in response to detecting a new cluster among the database of traffic samples.

In some embodiments, system 200 comprises assignment module 243. System 200 uses assignment module 243 to assign a family of files (e.g., a cluster of file signatures) to service to review the cluster in connection with classifying the files, determining YARA rules, or confirming a predicted classification obtained from classification module 239. The service may be another module, system, or service running that generates a predicted classification based at least in part on querying a machine learning module. Additionally, or alternatively, the service may be client associated with a human operator that is tasked with analyzing the family of files. In connection with analyzing the files, the system can generate YARA rules (if any) that are implemented to provide quick classifications such as by intermediate classifier module 235.

In some embodiments, system 200 comprises notification module 245. System 200 uses notification module 245 to provide an indication of the traffic classification, such as an indication whether the traffic is malicious, an indication whether the traffic is malicious traffic, etc. Additionally, or alternatively, system 200 uses notification module to provide an indication of an attribution of a traffic sample to a known malicious exploit (e.g., campaign or tool), an indication that the traffic sample does not match a known campaign or tool, etc. Notification module 245 provides the indication (e.g., the report) to another system or service, such as inline security or other security entity requesting the traffic classification or otherwise handling the traffic, or an administrator system (e.g., used by a network administrator while evaluating a security policy posture, etc.), etc. Notification module 245 may also provide an indication of an active measure to be implemented or a recommendation for an active measure to be implemented (e.g., a recommendation for handling the traffic based on the traffic classification, a recommendation for a remedial action to be performed in response to detection that a traffic sample matches a known campaign or tool, etc.).

System 200 may use notification module 245 to provide to one or more security entities (e.g., a firewall), nodes, or endpoints (e.g., a client terminal) an update to a whitelist of traffic, such as a whitelist of IP addresses (e.g., IP addresses from which HTTP requests originate) or a whitelist of traffic signatures (e.g., hashes for samples deemed to be benign). According to various embodiments, notification module 245 obtains a hash, signature, or other unique identifier associated with the domain (e.g., a webpage for the domain) or network traffic, and provides the indication of whether the sample is malicious in connection with the hash, signature, or other unique identifier associated with the sample (e.g., the file signature).

If a signature for a received sample is included in the set of signatures for samples previously deemed malicious (e.g., a blacklist of samples), the security entity or an endpoint can prevent the transmission of the corresponding traffic or prevent traffic to/from a client device from which traffic was collected.

In some embodiments, system 200 comprises security enforcement module 247. System 200 uses security enforcement module 247 to enforce one or more security policies with respect to information such as network traffic, .NET files, files, etc. Security enforcement module 247 enforces the one or more security policies based on whether the .NET file is determined to be malicious. As an example, in the case of system 200 being a security entity or firewall, system 200 comprises security enforcement module 247. Firewalls typically deny or permit network transmissions based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, information obtained via a web interface or other user interface such as an interface to a database system (e.g., an SQL interface), and/or other file transfers.

According to various embodiments, storage 215 comprises one or more of filesystem data 260, code data 265, and/or prediction data 270. Storage 215 comprises a shared storage (e.g., a network storage system) and/or database data, and/or user activity data.

In some embodiments, filesystem data 260 comprises a database such as one or more datasets (e.g., one or more datasets for .NET files, exploit traffic, and/or .NET file attributes, mappings of indicators of maliciousness to .NET files or hashes, signatures or other unique identifiers of .NET files, mappings of indicators of whether a particular .NET file is benign to .NET files or hashes, signatures or other unique identifiers of .NET files, etc.). Filesystem data 260 comprises data such as historical information pertaining to .NET files (e.g., maliciousness of NET files), a whitelist of NET files deemed to be safe (e.g., not suspicious, benign, etc.), a blacklist of NET files deemed to be suspicious or malicious (e.g., .NET files for which a deemed likelihood of maliciousness exceeds a predetermined/preset likelihood threshold), information associated with suspicious or malicious .NET files, etc.

Code data 265 comprises data for the code of the file(s). For example, code data 265 comprises the file, the disassembled binary, the MSIL, a function or method code, etc.

Prediction data 270 comprises information pertaining to a determination of whether the .NET file analyzed by system 200 is malicious. For example, prediction data 270 stores an indication that the .NET file is malicious, an indication that the .NET file is benign, etc. The information pertaining can be obtained by notification module 245 and provided (e.g., communicated to the applicable security entity, endpoint, or other system). In some embodiments, prediction data 270 comprises hashes or signatures for .NET files such as .NET files that are analyzed by system 200 to determine whether such .NET files are malicious, or a historical dataset that has been previously assessed for maliciousness such as by a third party. Prediction data 270 can include a mapping of hash values to indications of maliciousness (e.g., an indication that the corresponding is malicious or benign, etc.).

According to various embodiments, memory 220 comprises executing application data 275. Executing application data 275 comprises data obtained or used in connection with executing an application such as an application executing a hashing function, an application to extract information from a .NET file, an application to extract information from a file, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious files, a document preparation application, a report preparation application, a user interface application, a data analysis application, an anomaly detection application, a user authentication application, a security policy management/update application, etc.).

FIG. 3A is an illustration of code for a method comprised in an example of a benign .NET file. In the example shown, code 300 comprises code for a function/method implemented by a benign file. The system obtains code 300 based on disassembling a file, such as a file obtained from network communicated across a network (e.g., a file obtained by a security entity, etc.). Code 300 comprises a set of operators and a set of corresponding operands.

Figure 3B:
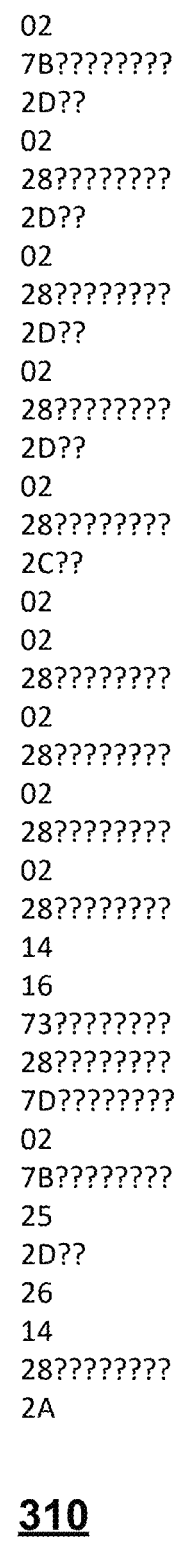

FIG. 3B is an illustration of a wildcarded method based on the method code for the method comprised in an example of a benign .NET file. In the example shown, wildcarded method 310 corresponds to a wildcarded version of the function/method corresponding to code 300. As shown, the wildcarded version of the function/method is data independent. The wildcarded version of the function/method is a representation of the various operators in the function/method. For example, the system obtains code 300 based on disassembling the file, identifies the functions/methods in the disassembly, and wildcards the function/method. For example, the system parses a .NET binary and identifies the methods, and transforms the code for each MSIL code into a uniformed format.

FIG. 3C is an illustration of code for a method comprised in an example of a benign .NET file. In the example shown, code 320 comprises code for a function/method implemented by a benign file. The system obtains code 320 based on disassembling a file, such as a file obtained from network communicated across a network (e.g., a file obtained by a security entity, etc.). Code 320 comprises a set of operators and a set of corresponding operands.

FIG. 3D is an illustration of a wildcarded method based on the method code for the method comprised in an example of a benign .NET file. In the example shown, wildcarded method 330 corresponds to a wildcarded version of the function/method corresponding to code 320.

FIG. 4A is an illustration of code for a method comprised in an example of a malicious .NET file. In the example shown, code 400 comprises code for a function/method implemented by a malicious file. The system obtains code 400 based on disassembling a file, such as a file obtained from network communicated across a network (e.g., a file obtained by a security entity, etc.). Code 400 comprises a set of operators and a set of corresponding operands.

FIG. 4B is an illustration of a wildcarded method based on the method code for the method comprised in an example of a malicious .NET file. In the example shown, wildcarded method 410 corresponds to a wildcarded version of the function/method corresponding to code 400.

Figure 4C:
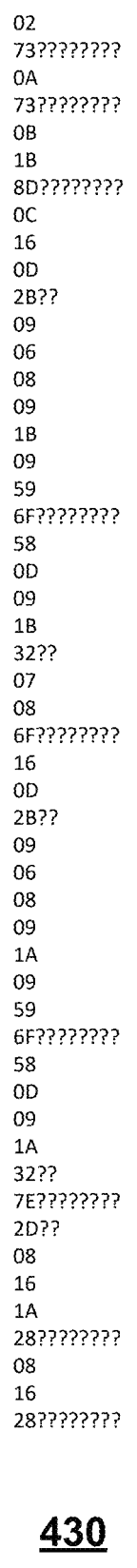

FIG. 4C is an illustration of code for a method comprised in an example of a malicious .NET file. In the example shown, code 430 comprises code for a function/method implemented by a malicious file. The system obtains code 430 based on disassembling a file, such as a file obtained from network communicated across a network (e.g., a file obtained by a security entity, etc.). Code 400 comprises a set of operators and a set of corresponding operands.

FIG. 4D is an illustration of a wildcarded method based on the method code for the method comprised in an example of a malicious .NET file. In the example shown, wildcarded method 440 corresponds to a wildcarded version of the function/method corresponding to code 430.

Figure 5:
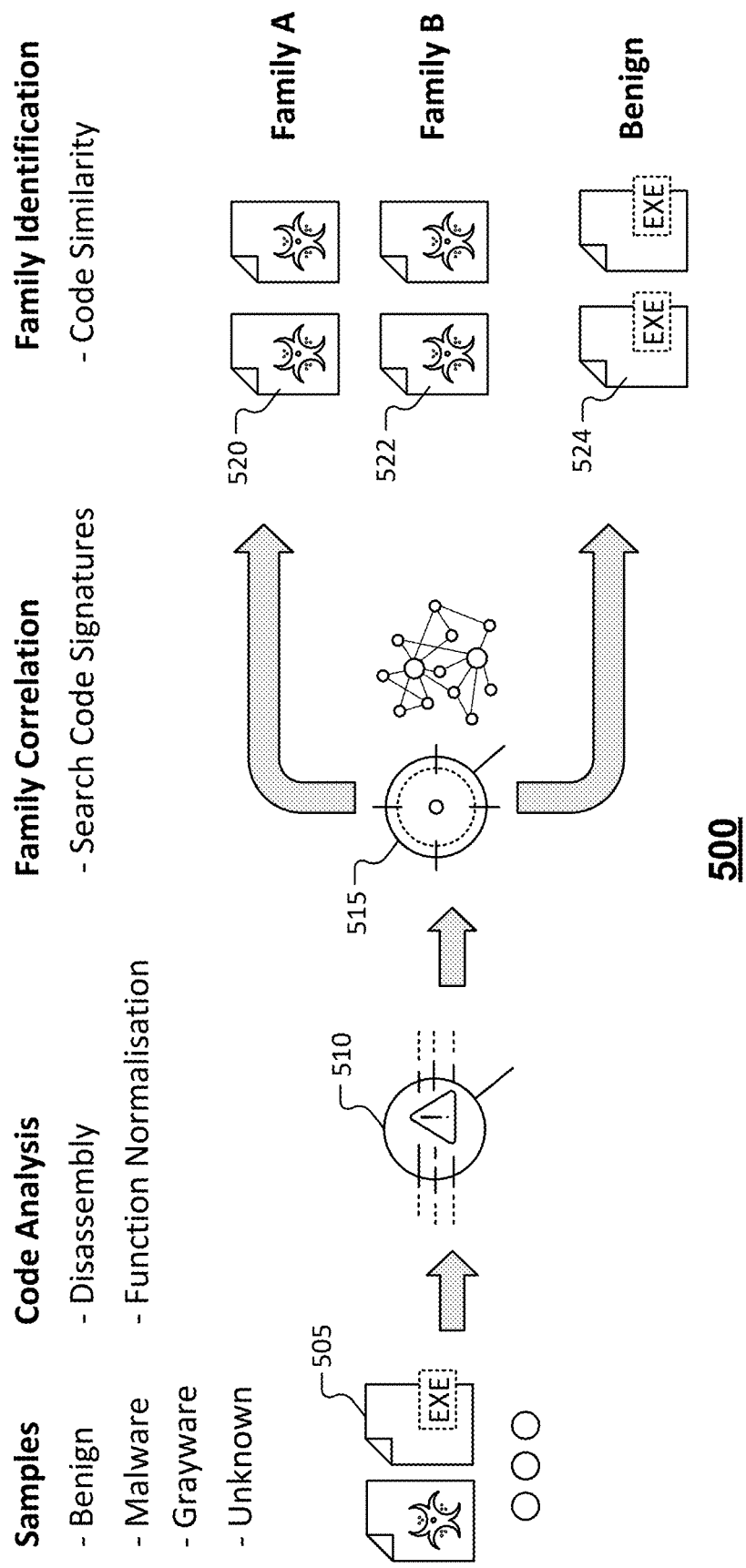
FIG. 5 is a flow diagram of a method for identifying file families based on file signatures according to various embodiments.

FIG. 5 is a flow diagram of a method for identifying file families based on file signatures according to various embodiments. In some embodiments, process 500 is implemented at least in part by system 100 of FIG. 1 and/or system 200 of FIG. 2.

At 505, the system obtains a set of one or more samples. The one or more samples correspond to files that may be benign, malware, grayware, or have an unknown classification (e.g., the maliciousness of the file is unknown). In some embodiments, a sample is a .NET file. The system determines to analyze the set of one or more samples in connection with determining file families (e.g., categorizing the samples into a set of families) and/or performing a file classification (e.g., classify the file as benign, malicious, unknown, etc.).

At 510, the system performs code analysis on the set of one or more samples (e.g., files). For example, for each sample to be analyzed, the system parses the file binary (e.g., a .NET binary for a .NET file) and disassembles the instructions for the sample (e.g., the functions and other instructions implemented during execution of the file code). The system can parse the file binary to obtain a disassembled version of the sample (e.g., the Microsoft Intermediate Language (MSIL) for the file) using a tool such as dnfile, dncil, etc. The MSIL code is generally extracted from the data sections in the PE executable.

After obtaining the disassembled version of the sample, the system determines the methods in the code. The MSIL code has a list of instructions (e.g., operator information and operand information) to be interpreted. In response to identifying/determining the methods in the code of the sample (e.g., the MSIL code), the system obtains a set of method code respectively corresponding to the methods in the code, selects a method code (e.g., method MSIL code) from the set of method code, and transforms the method code into a unified format. In some embodiments, the system transforms the method code for each method in the sample code to a corresponding representation in a unified format. In some embodiments, the system transforms the method code for N methods in the sample code to corresponding representations in a unified format, where N is a positive integer less than the total number of methods in the sample code. N may be predefined, such as based on an analysis of a number of methods that are to be analyzed to enable a classifier sufficient information with which to generate an accurate classification for the sample (e.g., to classify a maliciousness of the sample).

In some embodiments, the unified format is data independent. As an example, the moving a register from A to B is represented as moving the register from C to D. The unified format or a process for transforming the method code into a unified format may be predefined. The system may identify the operators and the operands in the method code, and transform the method code in a manner that represents the operators independent from the specific operands implemented in the code. In some embodiments, the unified format includes operators and a predefined special character to represent the operands. For example, the operands are replaced with the special character. Using the entry at 20E9 of code 300 shown in FIG. 3A as an illustrative example, the system determines the operator to be denoted by "7b" and the operand information "07 00 00 04". As shown in wildcarded method 310, the operand information is replaced with the special character "?". Various other special characters may be implemented. In some embodiments, the operand information is represented by a predefined length/number of the special character. In various other embodiments, each value/digit in the operand information is replaced with the predefined special character so the cumulative length of the operator and operand remains the same. The transformation of the method code to the unified format generates a wildcarded method that keeps the functionality of the method without relying on the concrete registers or memory addresses being used.

In response to obtaining the wildcarded method(s) (e.g., after transforming the method code to the unified format), the system classifies the sample based on the wildcarded method and/or performs a family correlation to assess a correlation of a particular sample with another sample (e.g., a database of previously analyzed/classified samples).

At 515, in connection classifying/correlating a sample, the system generates a file signature based at least in part on the wildcarded method(s). The system may generate the file signature based on all of the wildcarded method(s) obtained for the sample. Alternatively, the system may generate the file signature based on N wildcarded method(s), where N is a predefined positive integer less than the total number of wildcarded methods obtained for the sample.

Additionally, or alternatively, the system determines the file family or file classification based at least in part on a determination that the collection of wildcarded methods for a file comprises a subset of one or more wildcarded methods that have been previously identified as malicious. For example, if a malicious family type always has a particular set of one or more methods, the system may define a YARA rule that indicates that a sample is deemed to belong to the malicious family type (or to be malicious) when a particular sample has the particular set of one or more methods for the malicious family type. The system may thus quickly determine that the sample corresponds to the malicious family type in response to determining that the collection of wildcarded methods for the sample comprises a subset of wildcarded methods that match the particular set of one or more methods that is indicative of the sample being of the malicious file type. The system may perform the check of whether a wildcarded method(s) is indicative of a correlation to a particular family type as it processes each wildcard method to potentially save the processing time for the wildcard methods to be processed upon detection of that the current wildcard method (or current subset of processed wildcarded methods) matches a YARA rule indicative of the sample being malicious or of a particular malicious family type.

In some embodiments, the system generates the file signature and/or classifies/correlates the sample based at least in part on one or more intermediate signatures (e.g., intermediate hashes) for the wildcarded method(s) for methods implemented by the sample. The file signature may also be referred to herein as the DNCodeHash. For each wildcarded method associated with the sample, the system determines an intermediate signature, such as by performing a predefined hashing function with respect to the wildcarded method. The intermediate signature can be used to perform a look up against a set of YARA rules to quickly determine if the sample can be deemed malicious or as belonging to a particular family type based on the intermediate signature rather than the file signature, which is more computationally expensive to obtain. In some embodiments, the predefined hashing function used to obtain intermediate signatures is the MD5 hashing function.

In response to determining a set of intermediate signatures for a sample, the system generates the file signature based at least in part on the set of intermediate signatures for the sample. The set of intermediate signatures may comprise intermediate signatures for each wildcarded method, or may comprise N intermediate signatures for N wildcarded methods (e.g., the first N wildcarded methods computed or invoked by the sample). In some embodiments, generating the file signature includes concatenating the intermediate signatures in the set of intermediate signatures and computing the file signature based on the concatenated intermediate signatures.

The concatenation of the intermediate signatures may be according to a predefined process. For example, the system may first sort the set of intermediate signatures (e.g., based on the respective intermediate hash values, such as an alphabetical order) and then concatenate the sorted set of intermediate signatures. The set of intermediate signatures may be sorted to provide a unified representation in the event that different malicious files of a particular set of malicious family types perform the methods in different orders.

In some embodiments, computing the file signature based on the set of intermediate signatures (e.g., the concatenated intermediate signatures) includes performing a predefined hashing function with respect to the set of intermediate signatures. The predefined hashing function for computing the file signature may be a fuzzy hashing function, such as SSDeep or TLSH hashing functions.

In some embodiments, the system classifies the sample based at least in part on performing a lookup against an index or dataset of a set of samples to determine whether the file signature for the sample matches a known sample (e.g., a previously analyzed/classified sample). For example, the system may check a whitelist of benign/non-malicious samples to determine whether the whitelist has an entry matching the file signature for the sample being analyzed. In response to determining that the whitelist has a matching entry, the system may deem the sample to be benign/non-malicious. As another example, the system may check a blacklist of malicious samples to determine whether the blacklist has an entry matching the file signature for the sample being analyzed. In response to determining that the blacklist has a matching entry, the system may deem the sample to be malicious. Matching the file signature with a signature stored in an index or dataset may be further used to determine a family type to which the sample belongs (e.g., the index may be a mapping of signatures to family types, etc.).

In some embodiments, the system performs a clustering with respect to a set of file signatures for a set of samples. The system can deem file signatures having a degree of similarity greater than a predefined similarity threshold (e.g., 95% similarity) to be a single cluster. Further, the system may deem the cluster to be a corresponding family type. The clustering of file signatures into a set of clusters can enable a more efficient analysis of the samples. For example, the volume of samples processed can be extremely large, thereby making analysis of all samples expensive. A security service may receive hundreds or thousands of false negatives every week. In some implementations, samples are assigned to a subject matter expert for manual review of the sample/family type. To avoid assignment of two different samples belonging to the same family to two different human reviewers, which would duplicate the effort in reviewing a particular family type, the system can determine the corresponding cluster for the family type and assign the family type to a particular human reviewer (e.g., to assess whether the samples were mis-classified as benign/non-malicious.

At 520, the system identifies the families for the sample. For example, the system determines that the samples obtained at 505 can be divided into file family A 520, file family B 522, and benign file family 524. The system may then handle the samples according to the family type to which they belong. For example, samples for a family type for which the index/dataset of previously analyzed samples does not have a matching entry can be to a human reviewer or other service for classifying the samples (e.g., performing a classification using a machine learning model). In some embodiments, the system assigns samples/clusters of samples for those samples that the classifier did not classify as malicious (e.g., the unknown or benign/non-malicious classified samples, which can lead to false negatives).

Figure 6:
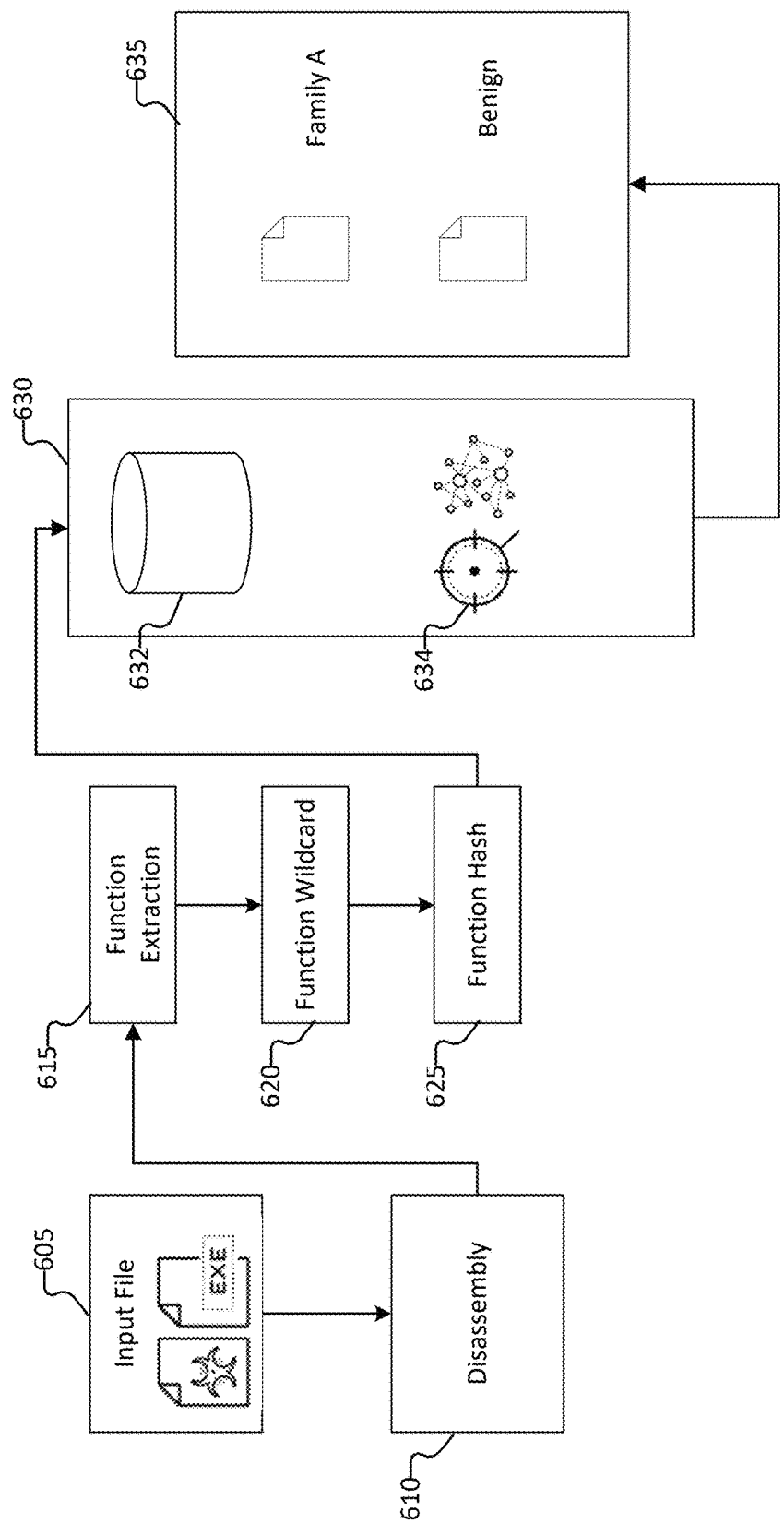
FIG. 6 is a flow diagram of a method for classifying a sample based at least in part on a file signature for the sample according to various embodiments.

FIG. 6 is a flow diagram of a method for classifying a sample based at least in part on a file signature for the sample according to various embodiments. In some embodiments, process 600 is implemented at least in part by system 100 of FIG. 1 and/or system 200 of FIG. 2.

At 605, the system obtains a sample to be analyzed. The sample may be obtained from a security entity, such as from a firewall that obtains the sample based on a communication across a corresponding enterprise network. At 610, the system disassembles the sample to obtain the code (e.g., the MSIL) for the sample. The code is generally a direct representation of the executable functionality, and thus serves as an ideal basis for classifying the samples.

At 615, the system performs a function extraction. For example, the system identifies the different functions/methods comprised in the code (e.g., the MSIL code). Each function/method may include a set of operators and corresponding operand.

At 620, the system obtains a function wildcard (e.g., also referred to herein as a wildcarded method). The function wildcard corresponds to a data independent representation of the function, such as by generating a representation that includes the set of operators and a set of predefined special characters in place of the set of operands for the function.

At 625, the system obtains a set of function hashes (e.g., also referred to herein as an intermediate hashes) for the sample. The function hash may be generated based on performing a predefined hashing function with respect to the function wildcard. For example, the system performs an MD5 hash of the function wildcard.

At 630, the system uses the function hashes for classifying the sample (e.g., predicting whether the sample is malicious or non-malicious/benign) or clustering the sample with a set of other samples deemed to have a similarity exceeding a predefined similarity threshold. The system may generate a file signature based on the set of function hashes for the sample, such as by sorting the set function hashes (e.g., by value or alphabetically, etc.), concatenating the sorted set of function hashes, and performing a hashing function (e.g., SSDeep, TLSH) with respect to the concatenated sorted set of function hashes.

In some embodiments, the system uses the file signature to perform a lookup against known samples (e.g., a set of previously classified malicious samples and/or a set of previously classified benign/non-malicious samples). In the example shown, the system performs the lookup against the index/database 632. In response to determining that the file signature matches a signature for a known sample, the system may classify the sample corresponding to the file signature according to the classification of the matched known sample. In response to determining that the file signature does not match any of the entries (e.g., file signatures) in index/database 632, the system may store the file signature for use in clustering or further analysis (e.g., by a manual reviewer or a machine learning model).

In some embodiments, the system uses the file signature to perform a clustering with respect to file signatures for samples that are unmatched with entries stored in index/database 632. The system may determine a set of clusters that respectively comprise file signatures/samples that have a similarity satisfying a predefined similarity threshold.

At 635, the system provides the sample classification (e.g., an indication of whether the sample is malicious or benign/non-malicious) and/or assigns the sample to another service to review and assess the sample. The other service may be a manual reviewer or a classifier that implements a machine learning model. The service reviews samples classified as benign/malicious or indeterminate and assesses whether the sample is malicious (e.g., to determine if the predicted classification of the sample was a false negative (e.g., benign) or a false positive (malicious))

Figure 7:
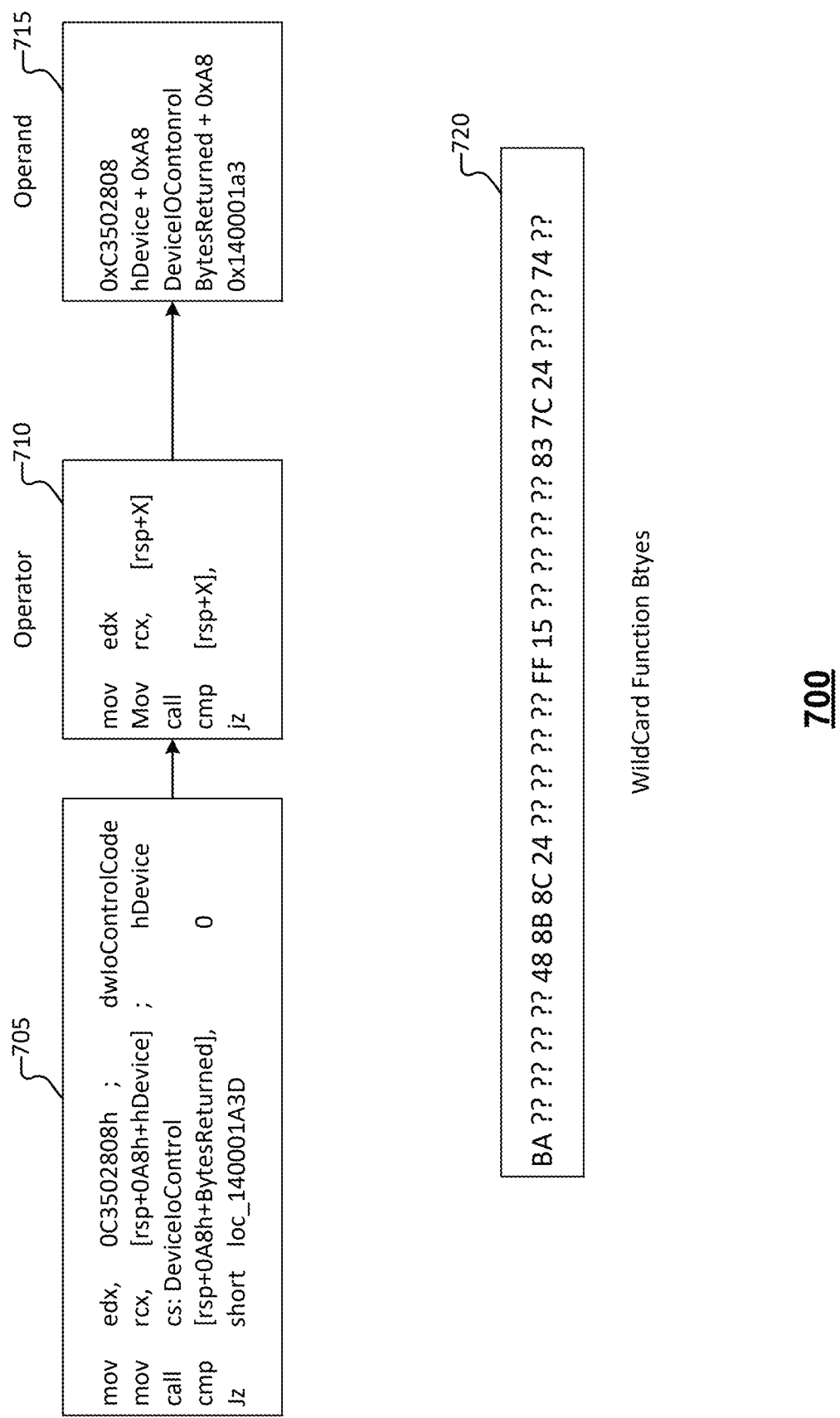
FIG. 7 is an example of transforming function code to a wildcard function according to various embodiments.

FIG. 7 is an example of transforming function code to a wildcard function according to various embodiments. In the example shown, the system obtains a sample (e.g., a file), disassembles the sample to MSIL code, and extracts function code 705. The system identifies a set of operators 710 and a set of operands 715 in function code 705. The system generates wildcard function 720 based at least in part on the set of operators 710. For example, the system replaces the operands in the set of operands 715 with a special character (e.g., "?") to normalize the function and cause the function to be data independent.

Figure 8:
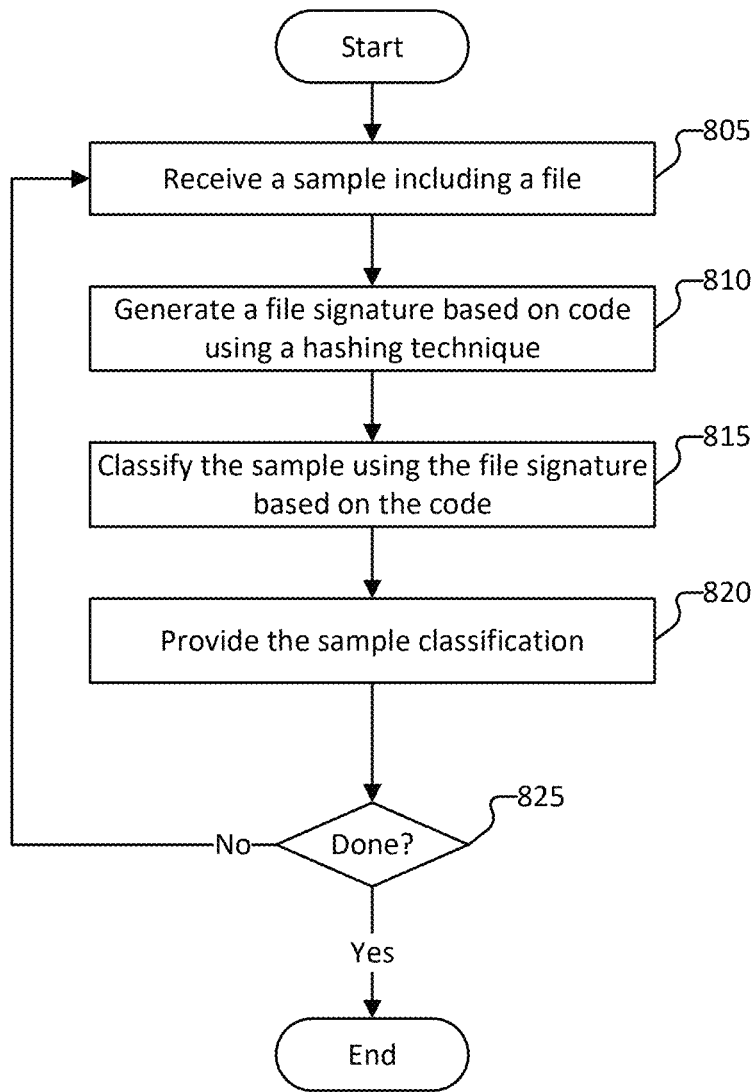
FIG. 8 is a flow diagram of a method for performing a sample classification according to various embodiments.

FIG. 8 is a flow diagram of a method for performing a sample classification according to various embodiments. In some embodiments, process 800 is implemented at least in part by system 100 of FIG. 1 and/or system 200 of FIG. 2. In some implementations, process 800 may be implemented by a security entity (e.g., a firewall) such as in connection with enforcing a security policy with respect to traffic communicated across a network or in/out of the network, and/or an anti-malware application running on a client system, etc. In some implementations, process 800 may be implemented by a client device such as a laptop, a smartphone, a personal computer, etc.

At 805, the system receives a sample including a file. The sample may be received from network traffic. For example, a firewall may obtain a file being communicated across a network. In some embodiments, the file is a Windows .NET file.

At 810, the system generates a file signature based on code using a hashing technique. The system may generate the file signature based on disassembled code within the file. For example, the system generates the file signature based on code for functions/methods that are implemented by the file.

In some embodiments, the system determines the file signature based at least in part on data independent characteristics of the code for the functions/methods. For example, the system uses a wildcard representation of the function/method. The wildcard representation may correspond to operands comprised in the function/method code.

In some embodiments, the hashing technique is predefined. Examples of hashing techniques that may be implemented include the SSDeep hashing function and the TLSH hashing function. Various other hashing functions may be implemented.

At 815, the system classifies the sample using the file signature based on the code. The system can compare the file signature to a database or index of known malware or known benign files and classify the sample according to a match to a known sample in the database. For example, if the file signature and a known sample in the database or index has a similarity that is greater than a predefined similarity threshold, the system classifies the obtained file according to the classification of the known sample (e.g., if the file signature is deemed similar to a known malicious sample, the system deems the file being analyzed to be malicious).

At 820, the system provides the sample classification.

At 825, a determination is made as to whether process 800 is complete. In some embodiments, process 800 is determined to be complete in response to a determination that no further samples or traffic are to be analyzed (e.g., no further predictions for traffic are needed), no further traffic is to be handled, an administrator indicates that process 800 is to be paused or stopped, etc. In response to a determination that process 800 is complete, process 800 ends. In response to a determination that process 800 is not complete, process 800 returns to 805.

Figure 9:
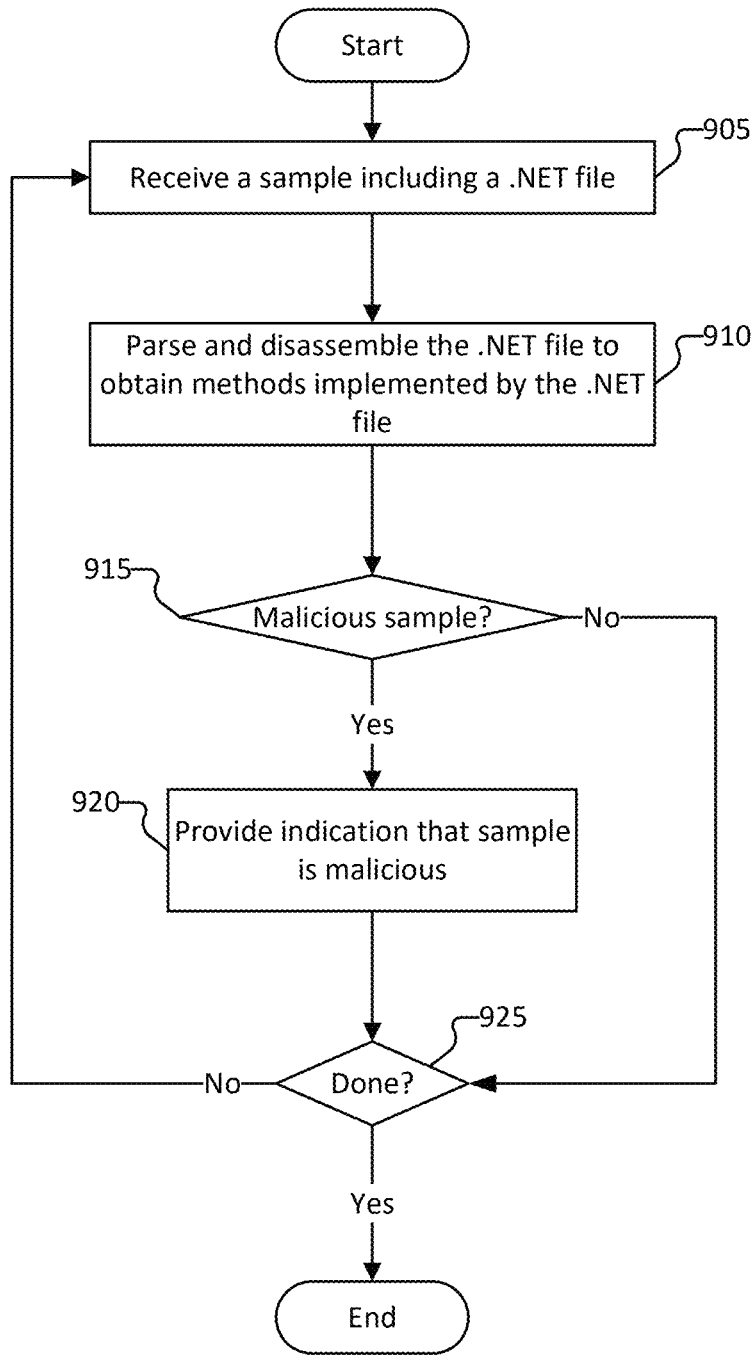
FIG. 9 is a flow diagram of a method for performing a sample classification according to various embodiments.

FIG. 9 is a flow diagram of a method for performing a sample classification according to various embodiments. In some embodiments, process 900 is implemented at least in part by system 100 of FIG. 1 and/or system 200 of FIG. 2. In some implementations, process 900 may be implemented by a security entity (e.g., a firewall) such as in connection with enforcing a security policy with respect to traffic communicated across a network or in/out of the network, and/or an anti-malware application running on a client system, etc. In some implementations, process 900 may be implemented by a client device such as a laptop, a smartphone, a personal computer, etc.

At 905, the system receives a sample including a .NET file.

At 910, the system parses and disassembles the .NET file to obtain methods implemented by the .NET file. For example, the system determines the functions within the code for the .NET file.

At 915, the system determines whether the sample is malicious.

In response to determining that the sample is malicious at 915, process 900 proceeds to 920. At 920, the system provides an indication that the sample is malicious. Conversely, in response to determining that the sample is not malicious at 915, process 900 proceeds to 925. In some embodiments, in response to determining that the sample is not malicious, the system provides an indication that the sample is not malicious. The system, or another system or service to which the sample classifications are provided, handles the network traffic (e.g., the analyzed sample) according to the sample classifications. For example, the system enforces a security policy with respect to the sample based on the sample classification (e.g., as malicious or benign).

At 925, a determination is made as to whether process 900 is complete. In some embodiments, process 900 is determined to be complete in response to a determination that no further samples or traffic are to be analyzed (e.g., no further predictions for traffic are needed), no further traffic is to be handled, an administrator indicates that process 900 is to be paused or stopped, etc. In response to a determination that process 900 is complete, process 900 ends. In response to a determination that process 900 is not complete, process 900 returns to 905.

Figure 10:
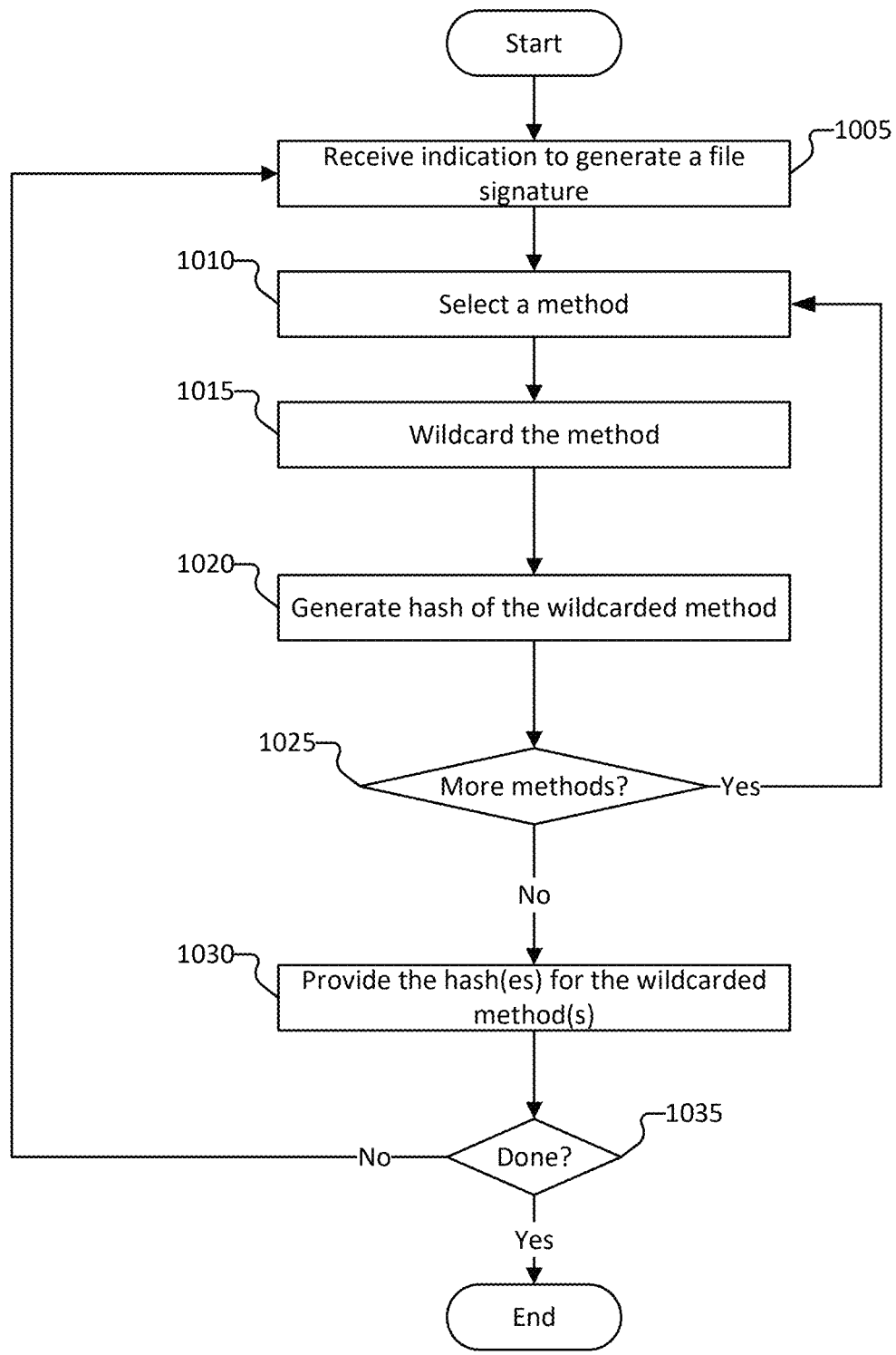
FIG. 10 is a flow diagram of a method for determining intermediate hashes for functions within code for a sample according to various embodiments.

FIG. 10 is a flow diagram of a method for determining intermediate hashes for functions within code for a sample according to various embodiments. In some embodiments, process 1000 is implemented at least in part by system 100 of FIG. 1 and/or system 200 of FIG. 2. In some implementations, process 1000 may be implemented by a security entity (e.g., a firewall) such as in connection with enforcing a security policy with respect to traffic communicated across a network or in/out of the network, and/or an anti-malware application running on a client system, etc. In some implementations, process 1000 may be implemented by a client device such as a laptop, a smartphone, a personal computer, etc.

At 1005, the system receives an indication to generate a file signature. The system determines to analyze the methods (e.g., functions) comprised in code for a sample based on determining that a maliciousness classification is to be performed for the sample. Process 1000 may be invoked by another system, service, or process in response to such system, service, or process determining that a maliciousness classification is to be determined. For example, process 1000 is invoked to obtain intermediate hashes (e.g., a set of hashes respectively corresponding to a set of methods/functions comprised in the sample or file), which in turn are to be used to classify the sample.

At 1010, the system selects a method. The system identifies the methods/functions in code for a file (e.g., the sample being analyzed).

At 1015, the system wildcards the method (e.g., to obtain a function wildcard or wildcarded method).

At 1020, the system generates hash of the wildcarded method. The hash of the wildcarded method may be deemed an intermediate hash. For example, a set of intermediate hashes for a set of methods within a file can be used to determine the file signature for a sample.

At 1025, the system determines whether another method(s) is to be analyzed. For example, the system determines whether another method is to be wildcarded and such wildcarded method being hashed. In some embodiments, the system determines whether another method is to be wildcarded based at least in part on one or more of (i) the file includes other methods/functions that have not yet been wildcarded, and (ii) the wildcarded method(s) are not indicative of the file being malicious.

In some embodiments, in response to obtaining the wildcarded method/function or corresponding hash, the system compares the wildcarded method against a set of predefined YARA rules. The YARA rules may correspond to a set of one or more predefined rules that if satisfied indicate that the sample is malicious. A YARA rule may include a rule indicating that a file comprising a particular function or method is deemed malicious (e.g., a rule that is generated based on determining that any file with the corresponding function is a malicious file). In response to the system determining that the method or hash of the wildcarded method matches a particular function known to be malicious or known to be included in malicious files, the system deems the file as malicious and determines that no further methods/functions of the file are to be analyzed. For example, the system can quickly determine if the file is malicious based on a method/function in the file matching a YARA rule to save the processing of all methods/functions of the file.

In response to determining that another method(s) is to be analyzed, process 1000 returns to 1010 and process 1000 iterates over 1010-1025 until the system determines that no further methods/functions are to be analyzed. Conversely, in response to determining that no further methods are to be analyzed, process 1000 proceeds to 1030.

At 1030, the system provides the hash(es) for the wildcarded method(s).

At 1035, a determination is made as to whether process 1000 is complete. In some embodiments, process 1000 is determined to be complete in response to a determination that no further samples or traffic are to be analyzed (e.g., no further predictions for traffic are needed), no further traffic is to be handled, an administrator indicates that process 1000 is to be paused or stopped, etc. In response to a determination that process 1000 is complete, process 1000 ends. In response to a determination that process 1000 is not complete, process 1000 returns to 1005.

Figure 11:
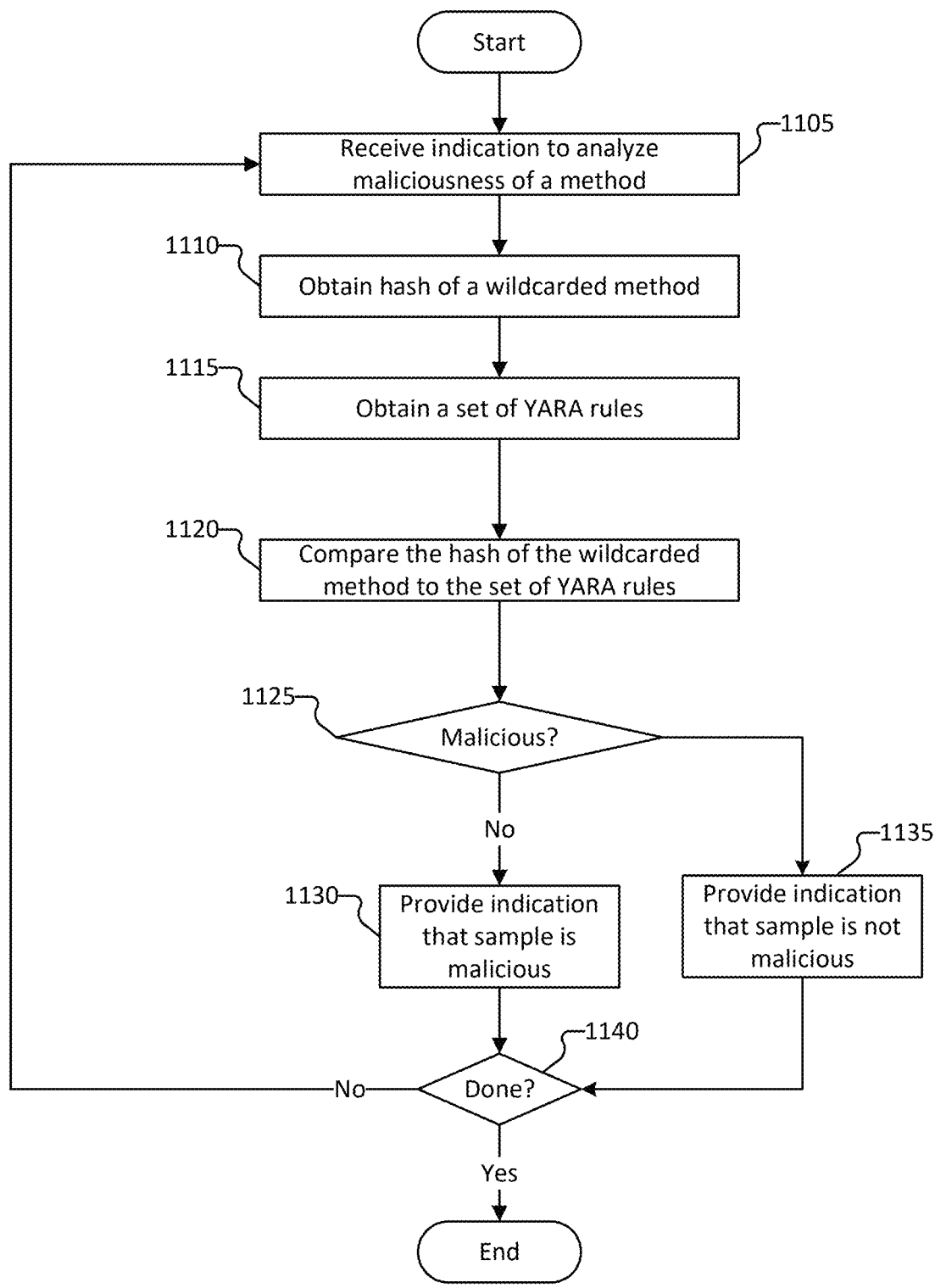
FIG. 11 is a flow diagram of a method for detecting malicious sample based at least in part on an intermediate hash for a function within code for the sample according to various embodiments.

FIG. 11 is a flow diagram of a method for detecting malicious sample based at least in part on an intermediate hash for a function within code for the sample according to various embodiments. In some embodiments, process 1100 is implemented at least in part by system 100 of FIG. 1 and/or system 200 of FIG. 2. In some implementations, process 1100 may be implemented by a security entity (e.g., a firewall) such as in connection with enforcing a security policy with respect to traffic communicated across a network or in/out of the network, and/or an anti-malware application running on a client system, etc. In some implementations, process 1100 may be implemented by a client device such as a laptop, a smartphone, a personal computer, etc.

At 1105, the system receives an indication to analyze a maliciousness of a method. In some embodiments, process 1100 is invoked by 1025 of process 1000 in connection with the system determining whether additional methods are to be analyzed. For example, 1025 invokes process 1100 to perform a quick check to determine whether a current method/function being analyzed is indicative of the sample (e.g., the file) being malicious, such as to save the system from processing the all functions/methods in the sample to obtain a maliciousness classification. Process 1100 is invoked to determine a file classification (e.g., a maliciousness classification) based on a particular function/method and a set of YARA rules.

At 1110, the system obtains a hash of a wildcarded method. For example, the system obtains the hash computed at 1020 of process 1000.

At 1115, the system obtains a set of YARA rules. The set of YARA rules may be predefined and stored in a security policy or a database or other index. The set of YARA rules may be determined by subject matter experts, or automatically based on the use of machine learning techniques to identify rules that can be used to determine if a file is malicious.

At 1120, the system compares the hash of the wildcard method to the set of YARA rules. In some embodiments, the system obtains a blacklist or index of functions or methods that presence of which in a file is indicative of the file being malicious. The system can perform a query/lookup against the blacklist or index to determine if the hash of the wildcard method matches any entries in the blacklist or index.

At 1125, the system determines if the sample is malicious based at least in part on the comparison of the wildcarded method and the set of YARA rules. In response to determining that the method/function is indicative of the sample being malicious (e.g., that the sample includes a function/method that is indicative of the sample being malicious), process 1100 proceeds to 1130 at which the system provides an indication that the sample is malicious. Conversely, in response to determining that the method/function is not indicative of the sample being malicious, process 1100 proceeds to 1135 at which the system provides an indication that the method/function is not indicative of the sample being malicious. In some embodiments, the indications provided at 1130 or 1135 can be provided to the system, service, or process that invoked process 1100.

At 1140, a determination is made as to whether process 1100 is complete. In some embodiments, process 1100 is determined to be complete in response to a determination that no further samples or traffic are to be analyzed (e.g., no further predictions for traffic are needed), no further traffic is to be handled, no further methods/functions are to be analyzed, an administrator indicates that process 1100 is to be paused or stopped, etc. In response to a determination that process 1100 is complete, process 1100 ends. In response to a determination that process 1100 is not complete, process 1100 returns to 1105.

Figure 12:
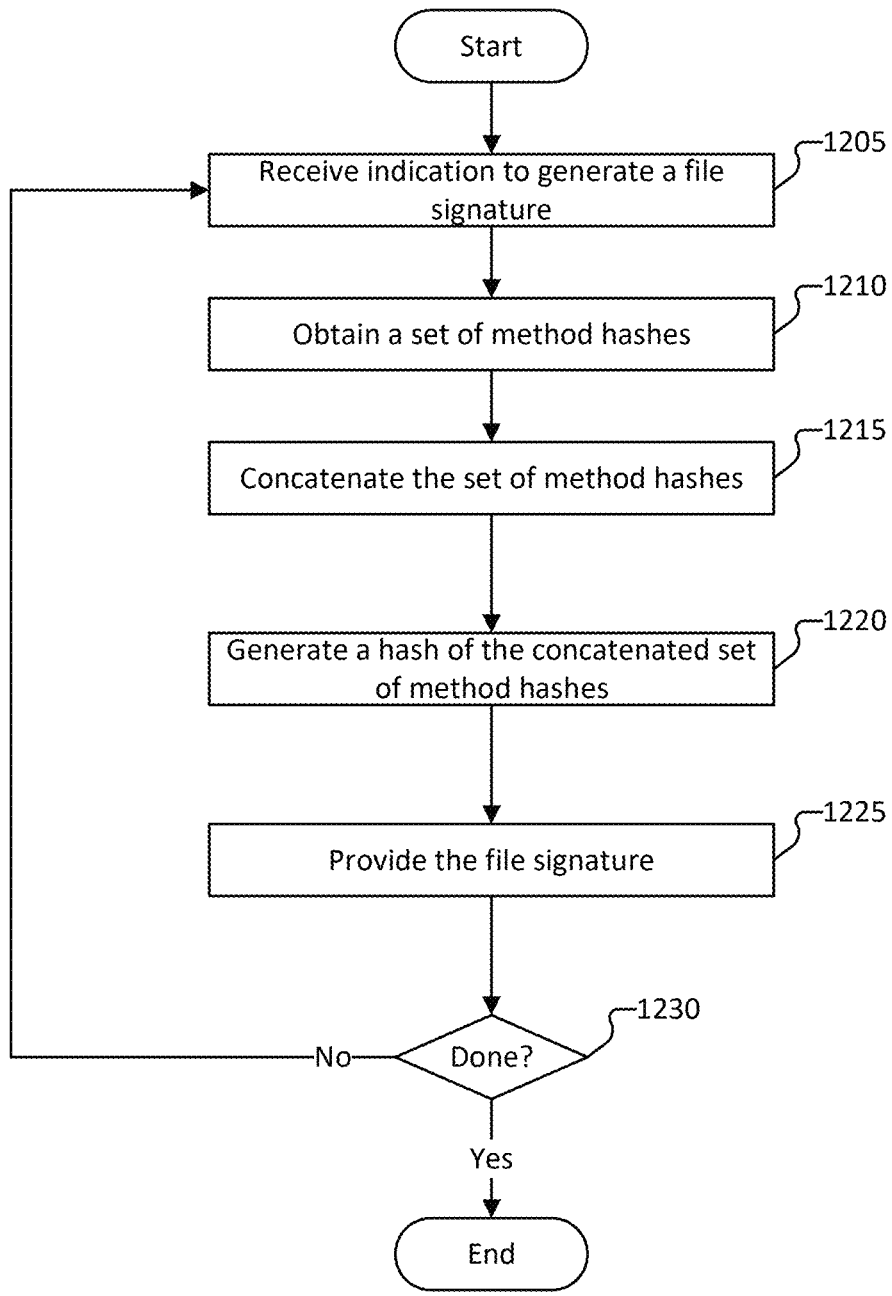
FIG. 12 is a flow diagram of a method for obtaining a file signature for a sample according to various embodiments.

FIG. 12 is a flow diagram of a method for obtaining a file signature for a sample according to various embodiments. In some embodiments, process 1200 is implemented at least in part by system 100 of FIG. 1 and/or system 200 of FIG. 2. In some implementations, process 1200 may be implemented by a security entity (e.g., a firewall) such as in connection with enforcing a security policy with respect to traffic communicated across a network or in/out of the network, and/or an anti-malware application running on a client system, etc. In some implementations, process 1200 may be implemented by a client device such as a laptop, a smartphone, a personal computer, etc.

At 1205, the system receives an indication to generate a file signature.

At 1210, the system obtains a set of method hashes.

At 1215, the system concatenates the set of method hashes.

At 1220, the system generates a hash of the concatenated set of method hashes. For example, the system obtains the file signature for a sample based on a hashing of the set of method hashes (e.g., the intermediate hashes).

At 1225, the system provides the file signature. In some embodiments, the system provides the file signature to the system, service, or process that invoked process 1200.

At 1230, a determination is made as to whether process 1200 is complete. In some embodiments, process 1200 is determined to be complete in response to a determination that no further samples or traffic are to be analyzed (e.g., no further predictions for traffic are needed), no further traffic is to be handled, the system/service/process that invoked process 1200 has acknowledged receipt of the file signature, no further file signatures are to be obtained, an administrator indicates that process 1200 is to be paused or stopped, etc. In response to a determination that process 1200 is complete, process 1200 ends. In response to a determination that process 1200 is not complete, process 1200 returns to 1205.

Figure 13:
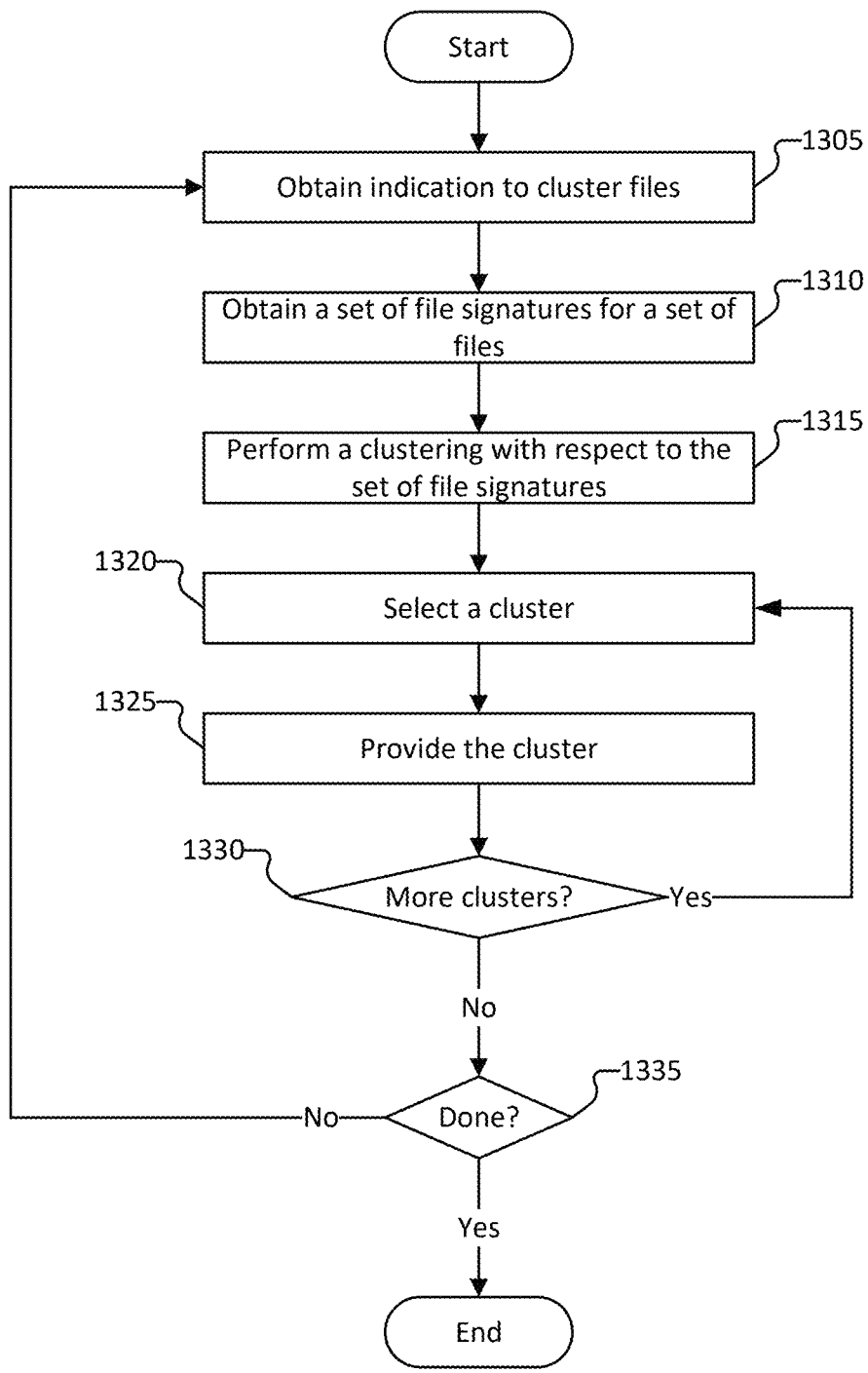
FIG. 13 is a flow diagram of a method for clustering files based on respective file signatures to obtain a set of file families according to various embodiments.

FIG. 13 is a flow diagram of a method for clustering files based on respective file signatures to obtain a set of file families according to various embodiments. In some embodiments, process 1300 is implemented at least in part by system 100 of FIG. 1 and/or system 200 of FIG. 2. In some implementations, process 1300 may be implemented by a security entity (e.g., a firewall) such as in connection with enforcing a security policy with respect to traffic communicated across a network or in/out of the network, and/or an anti-malware application running on a client system, etc. In some implementations, process 1300 may be implemented by a client device such as a laptop, a smartphone, a personal computer, etc.

In some embodiments, process 1300 is invoked periodically according to a predefined frequency. For example, the system performs process 1300 periodically to identify new types of files, such as emerging malicious campaigns or malware. In some embodiments, process 1300 is invoked in response to a number of unclassified files/samples (e.g., samples that did not match any samples in an index or database of classified samples such as a whitelist or blacklist or sample) exceeds a predefined number of sample threshold.

At 1305, the system obtains an indication to cluster files.

At 1310, the system obtains a set of file signatures for a set of files.

At 1315, the system performs a clustering with respect to the set of file signatures.

At 1320, the system selects a cluster.

At 1325, the system provides the cluster.

At 1330, the system determines whether additional clusters are to be provided. For example, the system determines whether another cluster is identified and/or to be assigned, such as to a service or subject matter expert to analyze the cluster.

In response to determining that another cluster is to be provided or otherwise analyzed, process 1300 returns to 1320 and process 1300 iterates over 1320-1330 until no further clusters are to be provided or analyzed. Conversely, in response to determining that no further clusters are to be provided, process 1300 proceeds to 1335.

At 1335, a determination is made as to whether process 1300 is complete. In some embodiments, process 1300 is determined to be complete in response to a determination that no further samples or traffic are to be analyzed (e.g., no further predictions for traffic are needed), no further traffic is to be handled, the system/service/process that invoked process 1300 has acknowledged receipt of the cluster(s), no further clustering is to be performed, an administrator indicates that process 1300 is to be paused or stopped, etc. In response to a determination that process 1300 is complete, process 1300 ends. In response to a determination that process 1300 is not complete, process 1300 returns to 1305.

Figure 14:
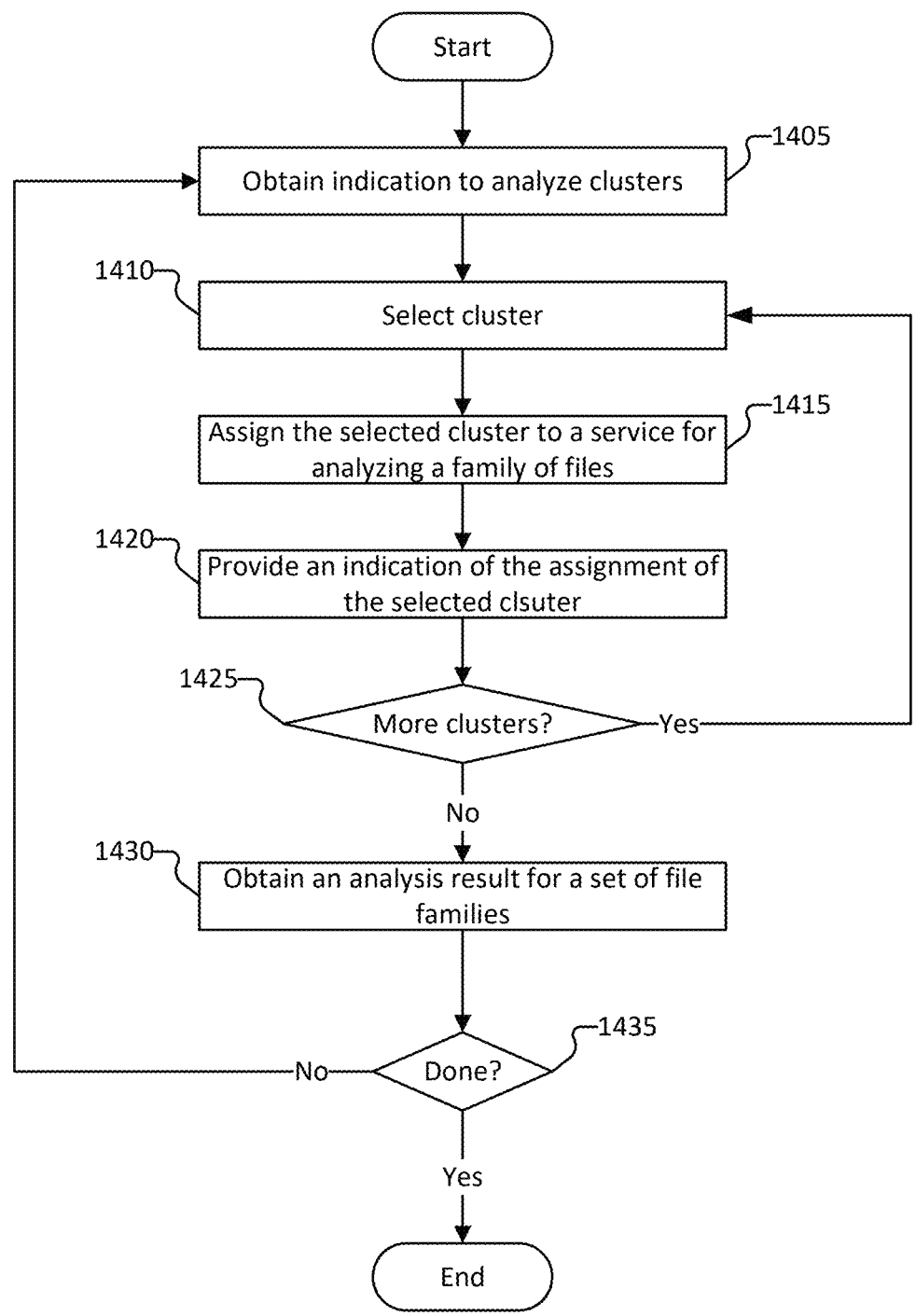
FIG. 14 is a flow diagram of a method for obtaining an analysis result for a set of file families according to various embodiments.

FIG. 14 is a flow diagram of a method for obtaining an analysis result for a set of file families according to various embodiments. In some embodiments, process 1400 is implemented at least in part by system 100 of FIG. 1 and/or system 200 of FIG. 2. In some implementations, process 1400 may be implemented by a security entity (e.g., a firewall) such as in connection with enforcing a security policy with respect to traffic communicated across a network or in/out of the network, and/or an anti-malware application running on a client system, etc. In some implementations, process 1400 may be implemented by a client device such as a laptop, a smartphone, a personal computer, etc.

At 1405, the system obtains an indication to analyze clusters.

At 1410, the system selects a cluster.

At 1415, the system assigns the selected cluster to a service for analyzing a family of files.

At 1420, the system provides an indication of the assignment of the selected cluster.

At 1425, the system determines wither another cluster(s) is to be assigned.

In response to determining that another cluster is to be assigned and/or analyzed, process 1400 returns to 1410 and process 1400 iterates over 1410-1425 until no further clusters are to be assigned or analyzed. Conversely, in response to determining that no further clusters are to be assigned or analyzed, process 1400 proceeds to 1430.

At 1430, the system obtains an analysis result for a set of file families.

At 1435, a determination is made as to whether process 1400 is complete. In some embodiments, process 1400 is determined to be complete in response to a determination that no further samples or traffic are to be analyzed (e.g., no further predictions for traffic are needed), no further traffic is to be handled, the system/service/process that invoked process 1400 has acknowledged receipt of the cluster(s), no further file families are to be analyzed, an administrator indicates that process 1400 is to be paused or stopped, etc. In response to a determination that process 1400 is complete, process 1400 ends. In response to a determination that process 1400 is not complete, process 1400 returns to 1405.

Figure 15:
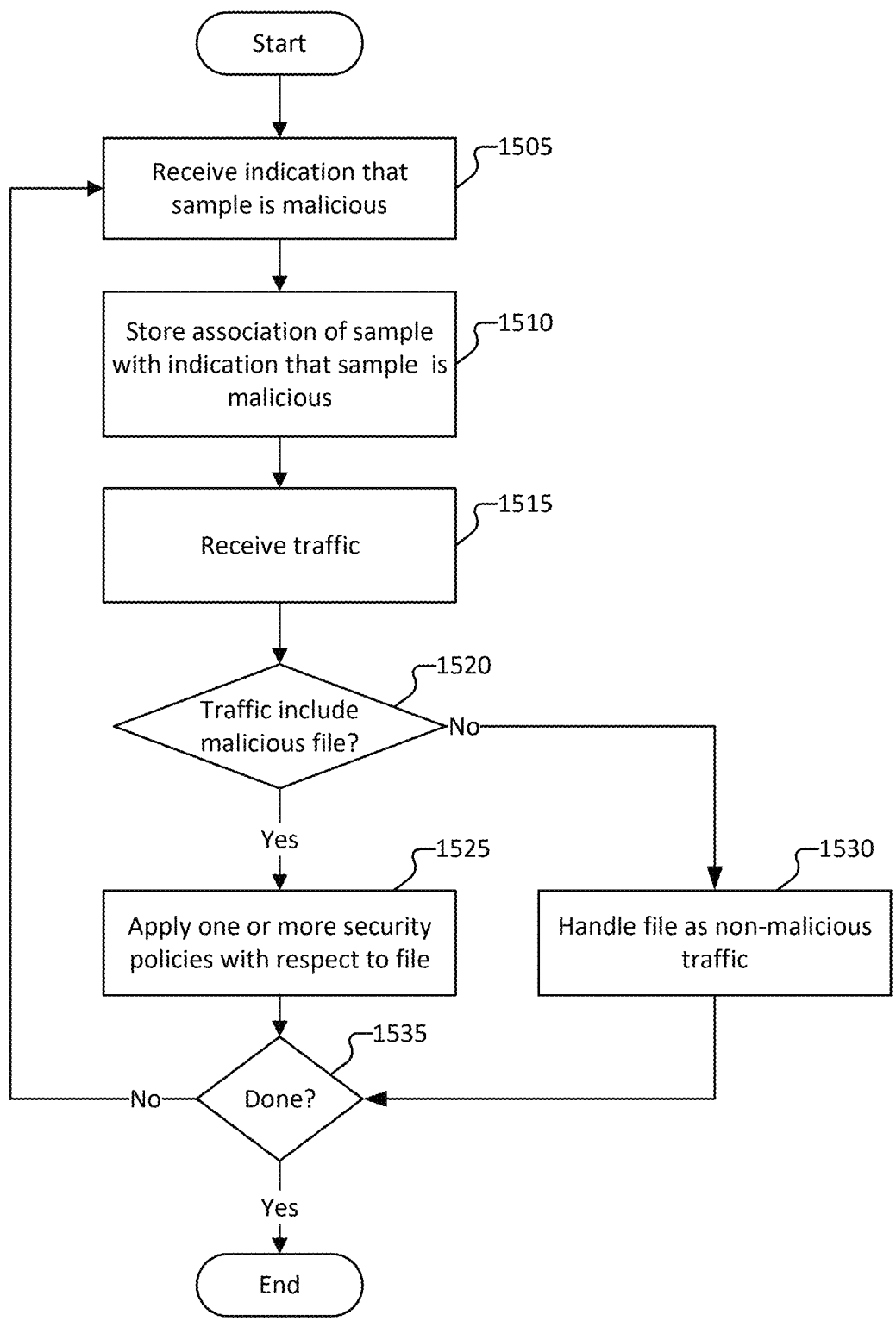
FIG. 15 is a flow diagram of a method for detecting a malicious file in received traffic according to various embodiments.

FIG. 15 is a flow diagram of a method for detecting a malicious file in received traffic according to various embodiments. In some embodiments, process 1500 is implemented at least in part by system 100 of FIG. 1 and/or system 200 of FIG. 2. In some implementations, process 1500 may be implemented by a security entity (e.g., a firewall) such as in connection with enforcing a security policy with respect to traffic communicated across a network or in/out of the network, and/or an anti-malware application running on a client system, etc. In some implementations, process 1500 may be implemented by a client device such as a laptop, a smartphone, a personal computer, etc.

At 1605, an indication that the sample is malicious is received. In some embodiments, the system receives (i) an indication that a sample is malicious and (ii) the sample or hash, signature, or other unique identifier associated with the sample. For example, the system may receive the indication that the sample is malicious from a service such as a security or malware service. The system may receive the indication that the sample is malicious from one or more servers.

According to various embodiments, the indication that the sample is malicious is received in connection with an update to a set of previously identified malicious files. For example, the system receives the indication that the sample is malicious as an update to a blacklist of malicious files.

At 1510, an association of the sample with an indication that the sample is malicious is stored. In response to receiving the indication that the sample is malicious, the system stores the indication that the sample is malicious in association with the sample or an identifier corresponding to the sample to facilitate a lookup (e.g., a local lookup) of whether subsequently received files are malicious. In some embodiments, the identifier corresponding to the sample stored in association with the indication that the sample is malicious comprises a hash of the file (or part of the file), a signature of the file (or part of the file), or another unique identifier associated with the file. In some embodiments, the storing of the sample in association with the indication of whether the sample is malicious comprises storing a signature for the .NET file in association with an indication of whether the sample is malicious. The signature for the .NET file may be a DNCodeHash (e.g., a hash computed based on the functions/methods in the code of the file).

At 1515, traffic is received. The system may obtain traffic such as in connection with routing traffic within/across a network, or mediating traffic into/out of a network such as a firewall, or a monitoring of email traffic or instant message traffic.

At 1520, a determination of whether the traffic includes a malicious file is performed. In some embodiments, the system obtains the file from the received traffic. For example, the system identifies the file as an attachment to an email, identifies the file as being exchanged between two client devices via an instant message program or other file exchange program, etc. In response to obtaining the file from the traffic, the system determines whether the file corresponds to a file comprised in a set of previously identified malicious files such as a blacklist of malicious files. In response to determining that the file is comprised in the set of files on the blacklist of malicious files, the system determines that the file is malicious (e.g., the system may further determine that the traffic includes the malicious file).

In some embodiments, the system determines whether the file corresponds to a file comprised in a set of previously identified benign files such as a whitelist of benign files. In response to determining that the file is comprised in the set of files on the whitelist of benign files, the system determines that the file is not malicious (e.g., the system may further determine that the traffic includes the malicious file).

According to various embodiments, in response to determining the file is not comprised in a set of previously identified malicious files (e.g., a blacklist of malicious files) or is comprised in a set of previously identified benign files (e.g., a whitelist of benign files), the system deems the file as being non-malicious (e.g., benign).

According to various embodiments, in response to determining the file is not comprised in a set of previously identified malicious files (e.g., a blacklist of malicious files) or a set of previously identified benign files (e.g., a whitelist of benign files), the system queries a malicious file detector (e.g., a machine learning classifier) to determine whether the file is malicious. For example, the system may quarantine the file until the system receives response from the malicious file detector as to whether the file is malicious. The malicious file detector may perform an assessment of whether the file is malicious such as contemporaneous with the handling of the traffic by the system (e.g., in real-time with the query from the system). The malicious file detector may correspond to malicious file detector 170 of system 100 of FIG. 1 and/or system 200 of FIG. 2.

In some embodiments, the system determines whether the file is comprised in the set of previously identified malicious files or the set of previously identified benign files by computing a hash or determining a signature or other unique identifier associated with the file, and performing a lookup in the set of previously identified malicious files or the set of previously identified benign files for a file matching the hash, signature, or other unique identifier. Various hashing techniques may be implemented. According to various embodiments, the determining whether the file is comprised in the set of previously identified malicious files or the set of previously identified benign files includes determining the signature (e.g., the DNCodeHash) corresponding to the file, and determining whether the signature is comprised in a historical dataset (e.g., a dataset comprising results of previous determinations of maliciousness).

In response to a determination that the traffic does not include a malicious file at 1520, process 1500 proceeds to 1530 at which the file is handled as non-malicious traffic/information.

In response to a determination that the traffic does include a malicious file at 1520, process 1500 proceeds to 1525 at which the file is handled as malicious traffic/information. The system may handle the malicious traffic/information based at least in part on one or more policies such as one or more security policies.

According to various embodiments, the handling of the file as malicious traffic/information may include performing an active measure. The active measure may be performed in accordance with (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the device attempts to open or execute the file, blocking transmission of the file, updating a blacklist of malicious files (e.g., a mapping of a hash for the file to an indication that the file is malicious), etc.

At 1535, a determination is made as to whether process 1500 is complete. In some embodiments, process 1500 is determined to be complete in response to a determination that no further samples are to be analyzed (e.g., no further predictions for files are needed), an administrator indicates that process 1500 is to be paused or stopped, etc. In response to a determination that process 1500 is complete, process 1500 ends. In response to a determination that process 1500 is not complete, process 1500 returns to 1505.

Figure 16:
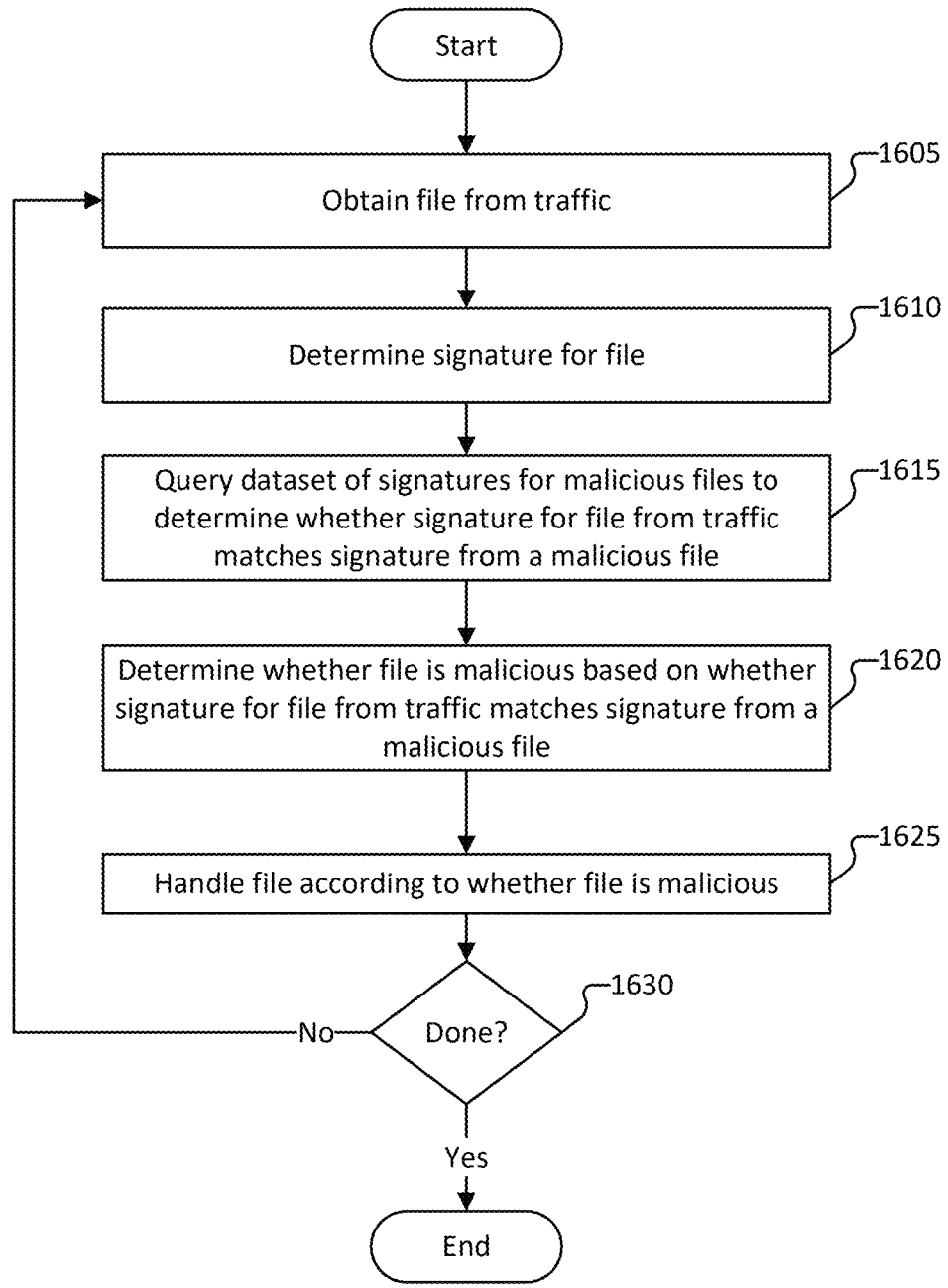
FIG. 16 is a flow diagram of a method for classifying and handling files received in network traffic according to various embodiments.

FIG. 16 is a flow diagram of a method for classifying and handling files received in network traffic according to various embodiments. In some embodiments, process 1600 is implemented at least in part by system 100 of FIG. 1 and/or system 200 of FIG. 2. In some implementations, process 1600 may be implemented by a security entity (e.g., a firewall) such as in connection with enforcing a security policy with respect to traffic communicated across a network or in/out of the network, and/or an anti-malware application running on a client system, etc. In some implementations, process 1600 may be implemented by a client device such as a laptop, a smartphone, a personal computer, etc.

At 1605 the system obtains a file from traffic. The system may obtain traffic such as in connection with routing traffic within/across a network, or mediating traffic into/out of a network such as a firewall, or a monitoring of email traffic or instant message traffic. In some embodiments, the system obtains the file from the received traffic. For example, the system identifies the file as an attachment to an email, identifies the file as being exchanged between two client devices via an instant message program or other file exchange program, etc.

At 1610, the system determines a signature corresponding to the file. In some embodiments, the system computes a hash or determines a signature or other unique identifier associated with the file, such as a hash computed with respect to the function/method code in the file. Various hashing techniques may be implemented. For example, the hashing technique may be determining (e.g., computing) the MD5 hash for a file. As another example, the hashing technique may be the determining (e.g., computing) a hash based on the SSDeep hashing function.

In some embodiments, the determining of a signature corresponding to the file comprises computing a DNCodeHash for the file (e.g., .NET file.) In some embodiments, the system disassembles the file, identifies the functions/methods in the code, wildcards the functions/methods (e.g., determines the operands and disregards the operands), computes hashes for the wildcarded functions/methods (e.g., determines intermediate hashes, such as an MD5 hash), concatenates hashes for the wildcarded functions/methods (e.g., the system orders the hashes for the wildcarded functions/methods and then concatenates the ordered hashes), and computes a hash for the concatenated ordered hashes of the wildcarded functions/methods.

At 1615, the system queries a dataset for signatures of malicious files to determine whether the signature corresponding to the file matches a signature from a malicious file. In some embodiments, the system performs a lookup in the dataset for signatures of malicious files for a file matching the hash, signature, or other unique identifier. The dataset for signatures of malicious files may be stored locally at the system or remotely on a storage system that is accessible to the system.

According to various embodiments, the determining whether the file is comprised in the set of previously identified malicious files or the set of previously identified benign files includes determining the file signature (e.g., the DNCodeHash) corresponding to the file, and determining whether the file signature (e.g., the DNCodeHash) is comprised in a historical dataset (e.g., a dataset comprising results of previous determinations of maliciousness).

At 1620, the system determines whether the file is malicious is made based at least in part on whether a file signature for the file matches a signature for a malicious sample. In some embodiments, the system determines whether the dataset of a malicious signature comprises a record matching the file signature for the file obtained from traffic. In response to determining that the historical dataset comprises an indication that a file corresponding to the file signature (e.g., the DNCodeHash) is malicious (e.g., the DNCodeHash is included in a blacklist of fields), the system deems the file obtained from the traffic at 1605 to be malicious.

At 1625, the file is handled according to whether the file is malicious. In some embodiments, in response to determining that the file is malicious, the system applies one or more security policies with respect to the file. In some embodiments, in response to determining that the file is not malicious, the system handles the file as being benign (e.g., the file is handled as normal traffic).

At 1630, a determination is made as to whether process 1600 is complete. In some embodiments, process 1600 is determined to be complete in response to a determination that no further samples are to be analyzed (e.g., no further predictions for files are needed), an administrator indicates that process 1600 is to be paused or stopped, etc. In response to a determination that process 1600 is complete, process 1600 ends. In response to a determination that process 1600 is not complete, process 1600 returns to 1605.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating a signature for a Windows NET binary, comprising:
    one or more processors; and
    a memory coupled to the one or more processors and configured to provide the one or more processors with instructions that:
        parse the Windows NET binary to identify a plurality of methods implemented by the Windows NET binary;
        disassemble each of the plurality of methods into intermediate language code;
        transform the intermediate language code for each method into a unified representation, including replacing one or more operands with wildcards to obtain data-independent transformation results;
        generate a plurality of intermediate hashes respectively corresponding to the data-independent transformation results for the plurality of methods;
        concatenate the plurality of intermediate hashes into a concatenated hash;
        generate a file signature by applying a hashing technique to the concatenated hash;
        classify a sample using the file signature based on the code to determine whether the sample is malicious or benign; and
        cause a security policy to be enforced at a security entity in accordance with the classification.

2. The system of claim 1, wherein the code corresponds to a Windows.NET binary.

3. The system of claim 1, wherein the hashing technique is an MD5 hash function.

4. The system of claim 1, wherein the hashing technique is an SSDeep hash function.

5. The system of claim 1, wherein the hashing technique is a TLSH hash function.

6. The system of claim 1, wherein classifying the sample using the file signature based on the code comprises:
    determining that the sample is a malicious sample based at least in part on the file signature.

7. The system of claim 1, wherein classifying the sample using the file signature based on the code comprises:
    determining that the sample is a benign sample based at least in part on the file signature.

8. The system of claim 1, wherein the one or more processors are further configured to:
    handle the sample based at least in part on a sample classification.

9. The system of claim 8, wherein the sample is handled based at least in part on the security policy.

10. The system of claim 8, wherein handling the sample comprises performing an active measure in response to determining that the sample corresponds to a malicious sample.

11. The system of claim 1, wherein the one or more processors are further configured to:
    generate a Yara rule to identify a known malware function method based on the one or more intermediate transformation results.

12. The system of claim 1, wherein the file signature is used in connection with one or more of malware learning, malware detection, and malware clustering.

13. The system of claim 1, wherein a set of signatures for a set of files are clustered in response to determining that the signatures have a similarity score higher than a predefined similarity threshold.

14. The system of claim 13, wherein the predefined similarity threshold is greater than 95 percent.

15. The system of claim 1, wherein a set of signatures for trusted or benign code samples is clustered in connection with generating a white list of code.

16. The system of claim 1, wherein the sample is determined to be malware based on the file signature matching a signature for a known malware.

17. The system of claim 1, wherein the sample is deemed to be benign code based on the file signature matching a signature for known benign code.

18. The system of claim 1, wherein causing the security policy to be enforced at the security entity comprises preventing execution of the Windows.NET binary in response to the classification indicating the sample is malicious.

19. The system of claim 1, wherein the plurality of methods are identified based on parsing metadata of a Common Language Runtime (CLR) header of the Windows-.NET binary.

20. The system of claim 1, wherein replacing one or more operands with wildcards comprises replacing constant values and memory addresses with a predetermined wildcard symbol while retaining operation codes.

21. The system of claim 1, wherein the file signature is stored in a signature database and used for at least one of:
    (i) generating a whitelist of trusted .NET methods, or
    (ii) preventing execution of a .NET binary determined to be malicious.

22. A method for generating a signature for a Windows-.NET binary, comprising:
    parsing the Windows.NET binary to identify a plurality of methods implemented by the Windows.NET binary;
    disassembling each of the plurality of methods into intermediate language code;
    transforming the intermediate language code for each method into a unified representation, including replacing one or more operands with wildcards to obtain data-independent transformation results;
    generating a plurality of intermediate hashes respectively corresponding to the data-independent transformation results for the plurality of methods;
    concatenating the plurality of intermediate hashes into a concatenated hash;
    generating a file signature by applying a hashing technique to the concatenated hash;
    classifying a sample using the file signature to determine whether the sample is malicious or benign; and
    causing a security policy to be enforced at a security entity in accordance with the classification.

23. A computer program product comprising a non-transitory computer readable medium for generating a signature for a Windows.NET binary, and the computer program product comprising computer instructions that when executed by one or more computer processors, cause the one or more computer processors to perform operations comprising:
   parsing the Windows.NET binary to identify a plurality of methods implemented by the Windows.NET binary;
   disassembling each of the plurality of methods into intermediate language code;
   transforming the intermediate language code for each method into a unified representation, including replacing one or more operands with wildcards to obtain data-independent transformation results;
   generating a plurality of intermediate hashes respectively corresponding to the data-independent transformation results for the plurality of methods;
   concatenating the plurality of intermediate hashes into a concatenated hash;
   generating a file signature by applying a hashing technique to the concatenated hash;
   classifying a sample using the file signature based on the code to determine whether the sample is malicious or benign; and
   causing a security policy to be enforced at a security entity in accordance with the classification.

* * * * *